(12) United States Patent
Weiss et al.

(10) Patent No.: US 12,608,510 B2
(45) Date of Patent: Apr. 21, 2026

(54) COMPUTER AIDED GENERATIVE DESIGN WITH FEATURE THICKNESS CONTROL TO FACILITATE MANUFACTURING AND STRUCTURAL PERFORMANCE

(71) Applicant: Autodesk, Inc., San Francisco, CA (US)

(72) Inventors: Benjamin McKittrick Weiss, Tualatin, OR (US); Nigel Jed Wesley Morris, Toronto (CA); Adrian Adam Thomas Butscher, Toronto (CA); Jesus Rodriguez, Farmington, MI (US)

(73) Assignee: Autodesk, Inc., San Francisco, CA (US)

( * ) Notice: Subject to any disclaimer, the term of this patent is extended or adjusted under 35 U.S.C. 154(b) by 979 days.

(21) Appl. No.: 17/707,886

(22) Filed: Mar. 29, 2022

(65) Prior Publication Data

US 2023/0177224 A1 Jun. 8, 2023

Related U.S. Application Data

(60) Provisional application No. 63/286,990, filed on Dec. 7, 2021.

(51) Int. Cl.
*G06F 30/12* (2020.01)
*G06F 111/04* (2020.01)
(Continued)

(52) U.S. Cl.
CPC .............. *G06F 30/12* (2020.01); *G06T 19/20* (2013.01); *G06F 2111/04* (2020.01);
(Continued)

(58) Field of Classification Search
None
See application file for complete search history.

(56) References Cited

U.S. PATENT DOCUMENTS

| | | | |
|---|---|---|---|
| 7,068,851 B1 | 6/2006 | Berkner | |
| 10,467,807 B1 | 11/2019 | Strater et al. | |

(Continued)

FOREIGN PATENT DOCUMENTS

| | | |
|---|---|---|
| CN | 107748916 | 3/2018 |
| CN | 110992356 | 4/2020 |

(Continued)

OTHER PUBLICATIONS

Denk, Martin, Klemens Rother, and Kristin Paetzold. "Subdivision Surface mid-surface reconstruction of topology optimization results and thin-walled shapes using surface skeletons." Proceedings of the Design Society 1 (2021): 2771-2780. (Year: 2021).*

(Continued)

*Primary Examiner* — Rehana Perveen
*Assistant Examiner* — Kyle H Tseng
(74) *Attorney, Agent, or Firm* — Fish & Richardson P.C.

(57) ABSTRACT

Methods, systems, and apparatus, including medium-encoded computer program products, for computer aided design with feature thickness control, include: a three-dimensional modeling program configured to provide voxelized thinning including preparing a voxelized sheet and line skeleton for a three-dimensional shape of a three-dimensional model, and/or ramped scaling based thickness constraint application during shape and/or topology generation including modifying an amount of change indicated by a current numerical assessment generated by numerical simulation. The three-dimensional modeling program can be an architecture, engineering and/or construction program (e.g., building information management program), a product design and/or manufacturing program (e.g., a CAM program), and/or a media and/or entertainment production program (e.g., an animation production program).

40 Claims, 15 Drawing Sheets

(51) Int. Cl.
　　*G06F 119/18*　　(2020.01)
　　*G06T 19/20*　　(2011.01)
(52) U.S. Cl.
　　CPC .. *G06F 2119/18* (2020.01); *G06T 2219/2016*
　　　　(2013.01); *G06T 2219/2021* (2013.01)

(56)　　　　　References Cited

U.S. PATENT DOCUMENTS

| | | | |
|---|---|---|---|
| 10,635,088 B1 * | 4/2020 | Bandara | G05B 19/4099 |
| 10,751,951 B1 * | 8/2020 | Nguyen | B33Y 10/00 67/81 |
| 11,675,333 B2 | 6/2023 | Bandara et al. | |
| 2007/0047810 A1 | 3/2007 | Grady | |
| 2009/0161724 A1 | 6/2009 | Timans | |
| 2012/0078585 A1 | 3/2012 | Ilies et al. | |
| 2013/0063512 A1 | 3/2013 | Takagi et al. | |
| 2013/0311450 A1 | 11/2013 | Ramani et al. | |
| 2014/0156229 A1 | 6/2014 | Norato et al. | |
| 2015/0190971 A1 | 7/2015 | Musuvathy et al. | |
| 2017/0024910 A1 | 1/2017 | Griffin et al. | |
| 2018/0046732 A1 | 2/2018 | Bergin et al. | |
| 2018/0079149 A1 | 3/2018 | Suresh et al. | |
| 2018/0345647 A1 | 12/2018 | Morris et al. | |
| 2018/0349531 A1 | 12/2018 | Morris et al. | |
| 2019/0366703 A1 | 12/2019 | Bacher et al. | |
| 2020/0134918 A1 | 4/2020 | Wang | |
| 2020/0150623 A1 | 5/2020 | Bandara et al. | |
| 2020/0151286 A1 * | 5/2020 | Willis | G06F 17/50 |
| 2021/0232120 A1 | 7/2021 | Marinov et al. | |
| 2021/0263498 A1 | 8/2021 | Bandara et al. | |
| 2021/0350036 A1 | 11/2021 | Kumar et al. | |
| 2021/0356939 A1 | 11/2021 | Jaesung et al. | |
| 2022/0091580 A1 | 3/2022 | Bandara et al. | |
| 2024/0126933 A1 | 4/2024 | Burla et al. | |

FOREIGN PATENT DOCUMENTS

| | | |
|---|---|---|
| CN | 111259255 | 6/2020 |
| EP | 2778992 | 9/2014 |
| WO | WO 2017/186786 | 4/2017 |
| WO | WO 2020/097216 | 5/2020 |
| WO | WO 2021/236054 | 11/2021 |
| WO | WO 2021/262201 | 12/2021 |
| WO | WO 2021/262456 | 12/2021 |

OTHER PUBLICATIONS

Denk, Martin et al. "Fully automated subdivision surface parametrization for topology optimized structures and frame structures using euclidean distance transformation and homotopic thinning." Proceedings of the Munich Symp. on Lightweight Design 2020: Tagungsband zum Münchner Leichtbauseminar pp. 18-27 (Year: 2021).*

Morris, Nigel, Adrian Butscher, and Francesco Iorio. "A subtractive manufacturing constraint for level set topology optimization." Structural and Multidisciplinary Optimization 61, No. 4 (2020): 1573-1588. (Year: 2020).*

Prohaska, Steffen, and H-C. Hege. "Fast visualization of plane-like structures in voxel data." In IEEE Visualization, 2002. VIS 2002., pp. 29-36. IEEE, 2002. (Year: 2002).*

Extended European Search Report in European Appln. No. 22211984.4. dated Apr. 25, 2023, 10 pages.

Arrieta et al., "Optimal design of aircraft structures with damage tolerance requirements", Structural and Multidisciplinary Optimization, Aug. 2005, 30(2):155-163.

Autodesk.com [online], "Modeling," Jul. 2022, retrieved Sep. 19, 2022, retrieved from URL <https://www.autodesk.com/products/fusion-360/blog/july-2022-product-update-whats-new/#Modeling>, 11 pages.

Dakshnamoorthy, "Automated Lattice Optimization of Hinge Fitting with Displacement Constraint," Thesis for Master of Science in Mechanical Engineering, The University of Texas at Arlington, Dec. 2016, 57 pages.

Emmendoerfer, et. al., "A level set approach for topology optimization with local stress constraints", Int. J. Numer. Meth. Engng 2014; 99:129-156 (Year: 2014).

Gournay, et al., "Shape and Topology Optimization of The Robust Compliance Via the Level Set Method," ESAIM: COCV vol. 14, No. 1, 2008, pp. 43-70 (Year: 2008).

Hoglund, "An Anisotropic Topology Optimization Method for Carbon Fiber-Reinforced Fused Filament Fabrication," Thesis for Master of Science in Mechanical Engineering, Baylor University, Aug. 2016, 182 pages.

James, et al., "Stress-based topology optimization using an isoparametric level set method", Finite elements in Analysis and Design 58 (2012) 20-30 (Year: 2012).

Novotny, et al., "Topological Sensitivity Analysis for Three-dimensional Linear Elasticity Problem", Comput. Methods Appl. Mech. Engrg. 196 (2007) 4354-4364 (Year: 2007).

Schmitt et al., "Control of minimum member size in parameter-free structural shape optimization by a medial axis approximation," Computational Mechanics, Sep. 2017, 61(6):717-727.

Shapes and Geometries: Metrics, Analysis, Differential Calculus and Optimization, 2nd ed., Delfour et al., 2011, Chapter 1, Sections 10-11, pp. 36-54.

Shapes and Geometries: Metrics, Analysis, Differential Calculus and Optimization, 2nd ed., Delfour et al., 2011, Chapters 9-10, pp. 457-570.

Smell et al., "IM5000031: Generative Design in Fusion 360: Another Year Older, Another Year Better," Autodesk University, 2021, 44 pages.

Wikipedia.org [online], "A* search algorithm," Aug. 18, 2022, retrieved on Sep. 19, 2022, retrieved from URL <https://en.wikipedia.org/wiki/A*_search_algorithm>, 13 pages.

Yin et al., "Topologically robust CAD model generation for structural optimisation," CoRR, submitted on Jun. 2020, arXiv:1906.07631, 26 pages.

Extended European Search Report in European Appln No. 24217857.2, dated Feb. 27, 2025, 12 pages.

Arisoy et al., "Design and Topology Optimization of Lattice Structures Using Deformable Implicit Surfaces for Additive Manufacturing," in ASME 2015 International Design Engineering Technical Conferences and Computers and Information in Engineering Conference (2015) 11 pages.

Brackett et al., "Topology Optimization for Additive Manufacturing," in Proceedings of the Solid Freeform Fabrication Symposium (2011) 15 pages.

Dapogny et al., "Geometric Constraints for Shape and Topology Optimization in Architectural Design," Computational Mechanics, Springer-Verlag, 2017, 59(6):933-965. 10.1007/s00466-017-1383-6. hal-01354004v3.

Gibou et al., "A Review of Level-set Methods and Some Recent Applications," Journal of Computational Physics (2018) 353:82-109.

Guest and Zhu, "Casting and Milling Restrictions in Topology Optimization via Projection-based Algorithms," in ASME 2012 International Design Engineering Technical Conferences and Computers and Information in Engineering Conference (2012) 8 pages.

Ikeya and Shimoda, "Multi-objective Free-form Optimization for Shape and Thickness of Shell Structures with Composite Materials," in 11th World Congress on Structural and Multidisciplinary Optimisation (2015) 6 pages.

Joshi et al., "CAD-integrated Topology Optimization (BGCE Honours Project)," Department of Informatics, Technical University of Munich (2016) 77 pages.

Langelaar, "Topology Optimization for Multi-axis Machining," Comput. Methods Appl. Mech. Engrg. (2019) 351:226-252.

Lee et al., "Building Skeleton Models via 3-D Medial Surface/Axis Thinning Algorithms," CVGIP: Graphical Models and Image Processing, Nov. 1994, 56(6):462-478.

Liu and Ma, "A Survey of Manufacturing Oriented Topology Optimization Methods," Advances in Engineering Software (2016) 100:161-175.

(56)  References Cited

OTHER PUBLICATIONS

Liu et al., "Current and Future Trends in Topology Optimization for Additive Manufacturing," Structural and Multidisciplinary Optimization (2018) 57:2457-2483.

Lu et al., "Build-to-Last: Strength to Weight 3D Printed Objects," ACM Trans. Graph. (2014) 33(4):97:1-97:10.

Nakayama and Shimoda, "Shape-topology Optimization for Designing Shell Structures," in VII European Congress on Computational Methods in Applied Sciences and Engineering (2016) 10 pages.

Sigmund and Maute, "Topology Optimization Approaches—a Comparative Review," Struct. Multidisc. Optim. (2013) 48:1031-1055.

Unknown author, "Topology Optimization R18.0 Feature and Usage Highlights," © 2016 ANSYS, Inc., Mar. 12, 2017, 29 pages.

Van Dijk et al., "Level-set Methods for Structural Topology Optimization: a Review," Struct. Multidisc. Optim. (2013) 48:437-472.

Vatanabe et al., "Topology Optimization with Manufacturing Constraints: a Unified Projection-based Approach," Advances in Engineering Software (2016) 100:97-112.

Xia et al., "Constraints of Distance From Boundary to Skeleton: For the Control of Length Scale in Level Set Based Structural Topology Optimization", Computer Methods in Applied Mechanics and Engineering, 2015, 295:525-542.

Xia et al., "A Level Set Based Method for the Optimization of Cast Part," Struct. Multidisc. Optim. (2010) 41:735-747.

* cited by examiner

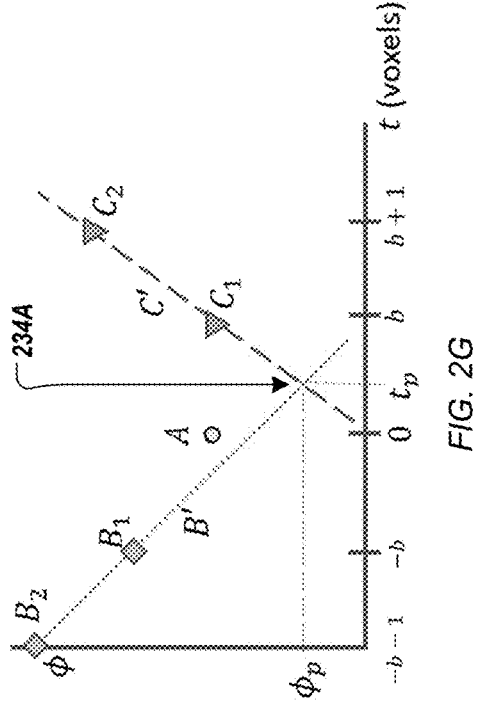
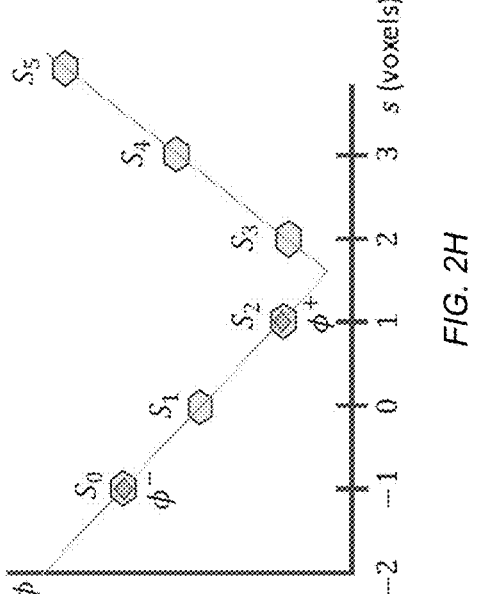
FIG. 2G
FIG. 2H
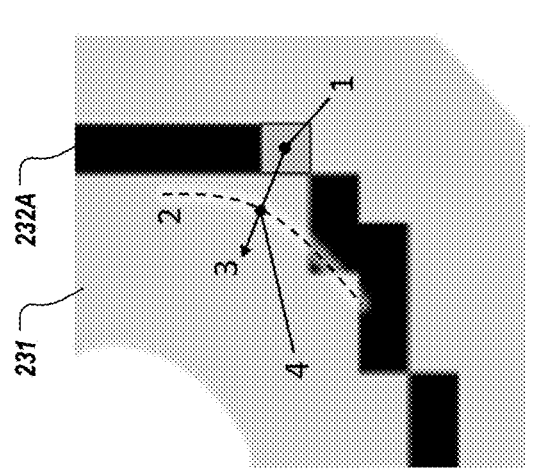
FIG. 2F
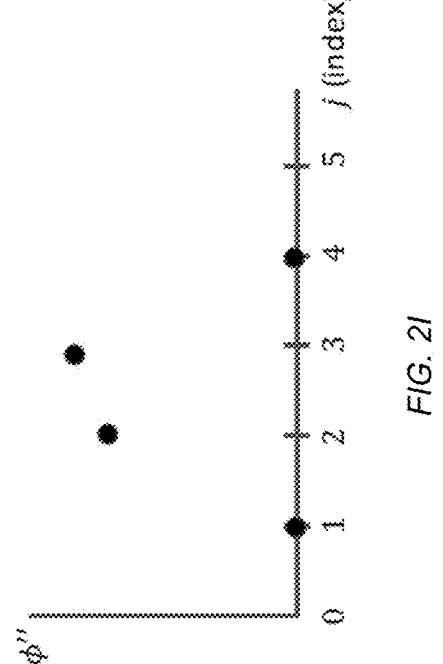
FIG. 2I

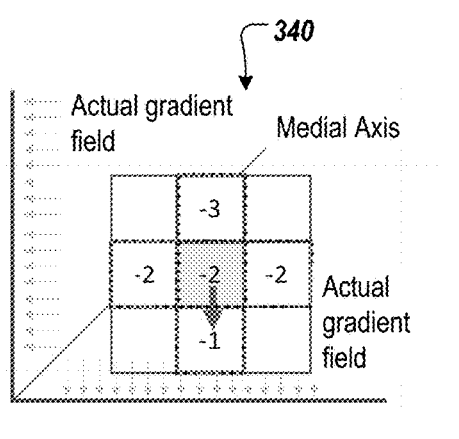
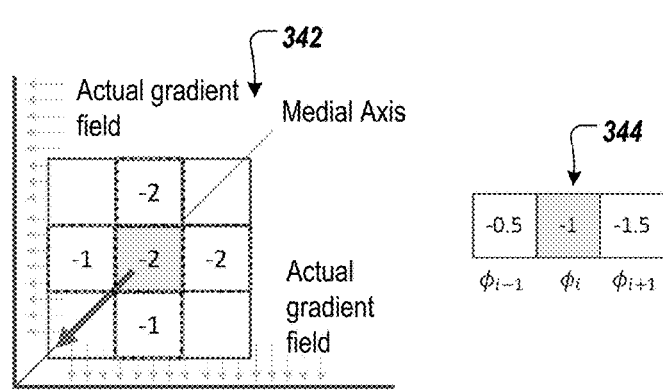
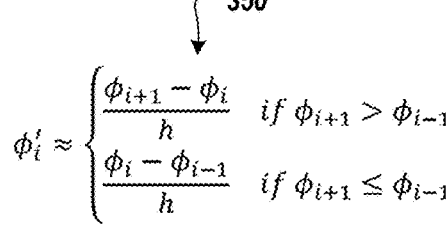
$$\phi_i' \approx \frac{\phi_{i+1} - \phi_i}{h}$$
346
$$\phi_i' \approx \frac{\phi_i - \phi_{i-1}}{h}$$
348
$$\phi_i' \approx \begin{cases} \dfrac{\phi_{i+1} - \phi_i}{h} & \text{if } \phi_{i+1} > \phi_{i-1} \\ \dfrac{\phi_i - \phi_{i-1}}{h} & \text{if } \phi_{i+1} \leq \phi_{i-1} \end{cases}$$
350
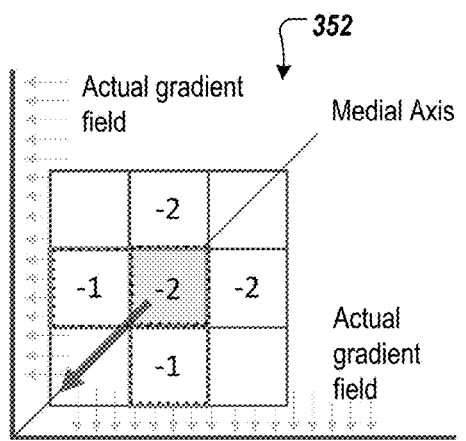
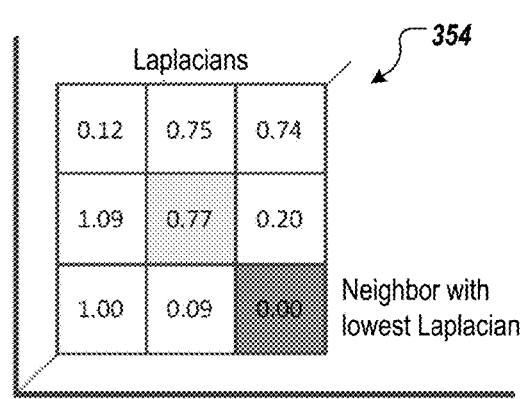
FIG. 3B
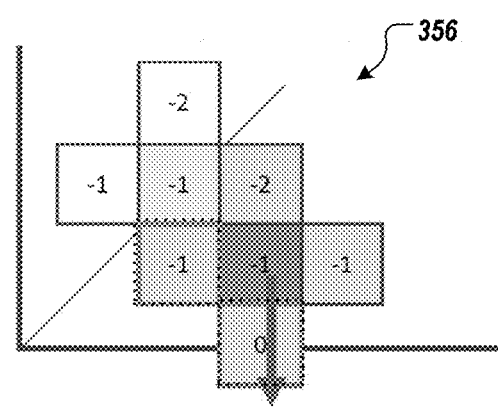

*500*

Data Processing Apparatus

Applications                    *504*

3D Modeling Program(s),
e.g., CAD Program(s),
with Ramped Scaling
Thickness Constraint
and/or Thinning-Based
Distance Measurement

**Operating
System**

Hardware/Firmware

*516*

Computer
Readable
Medium

*512*

Processor(s)

*518*

Comm.
Interface

*514*

Additional
Device(s)

*520*

User
Interface
Device(s)

*590*

Network

*580*

COMPUTER AIDED GENERATIVE DESIGN WITH FEATURE THICKNESS CONTROL TO FACILITATE MANUFACTURING AND STRUCTURAL PERFORMANCE

CROSS-REFERENCE TO RELATED APPLICATIONS

This application claims the benefit under 35 U.S.C. § 119(e) of U.S. Patent Application No. 63/286,990, entitled "COMPUTER AIDED GENERATIVE DESIGN WITH FEATURE THICKNESS CONTROL TO FACILITATE MANUFACTURING AND STRUCTURAL PERFORMANCE", filed Dec. 7, 2021.

BACKGROUND

This specification relates to computer aided design of physical structures, which can be manufactured using additive manufacturing, subtractive manufacturing and/or other manufacturing systems and techniques, or other structures, which can be provided as a digital asset, such as for use in animation.

Computer Aided Design (CAD) software has been developed and used to generate three-dimensional (3D) representations of objects, and Computer Aided Manufacturing (CAM) software has been developed and used to evaluate, plan and control the manufacture of the physical structures of those objects, e.g., using Computer Numerical Control (CNC) manufacturing techniques. Typically, CAD software stores the 3D representations of the geometry of the objects being modeled using a boundary representation (B-Rep) format. A B-Rep model is a set of connected surface elements specifying boundaries between a solid portion and a non-solid portion of the modeled 3D object. In a B-Rep model (often referred to as a B-Rep), geometry is stored in the computer using smooth and precise mathematical surfaces, in contrast to the discrete and approximate surfaces of a mesh model, which can be difficult to work with in a CAD program.

CAD programs have been used in conjunction with subtractive manufacturing systems and techniques. Subtractive manufacturing refers to any manufacturing process where 3D objects are created from stock material (generally a "blank" or "workpiece" that is larger than the 3D object) by cutting away portions of the stock material. Such manufacturing processes typically involve the use of multiple CNC machine cutting tools in a series of operations, starting with a roughing operation, an optional semi-finishing operation, and a finishing operation. In addition to CNC machining, other subtractive manufacturing techniques include electrode discharge machining, chemical machining, waterjet machining, etc. In contrast, additive manufacturing, also known as solid free form fabrication or 3D printing, refers to any manufacturing process where 3D objects are built up from raw material (generally powders, liquids, suspensions, or molten solids) in a series of layers or cross-sections. Examples of additive manufacturing include Fused Filament Fabrication (FFF) and Selective Laser Sintering (SLS). Other manufacturing techniques for building 3D objects from raw materials include casting and forging (both hot and cold) and molding.

In addition, CAD software has been designed to perform automatic generation of 3D geometry of one or more parts in a design (known as "topology optimization", "generative design", or "generative modelling", among others). This automated generation of 3D geometry often works within a "design domain" specified by a user or the CAD software and generates geometry typically by optimizing design objectives and respecting design constraints, which can be defined by the user, CAD software, or a third party. The design objectives can include but are not limited to minimizing waste material, minimizing the weight of the part, and minimizing the compliance, stress, maximum mass, maximum deflection under load, or other intrinsic property of the part, and are used to drive the shape synthesis process towards better designs. Though not required, it is typical for a design objective to be rooted in a simulation of the design (linear static, fluid dynamic, electromagnetic, etc.). Design constraints can include a variety of physical characteristics or behaviors that must be met in any generated design (requirements, either on individual parts or on the entire assembly, are also admissible); examples include maximum mass, maximum deflection under load, maximum stress, etc.

Geometric constraints may also be provided, for example to ensure the generated shape has no tiny features or is more easily realized using a particular manufacturing process. Further, the geometric inputs to such a 3D geometry generation tool can include one or more user- or CAD system-provided "preserve bodies" (indicating volumetric regions of the design space that should be filled in with material in a final design) or "preserve faces" (indicating interfaces between the design space and an adjacent component that should be contacted by the generated 3D geometry) which should always be present in the design. The "preserve bodies" or "preserve faces" can represent interfaces to other parts of the systems or locations on which boundary conditions should be applied (for example, mechanical loads and constraints). Other regions in which geometry should or should not be generated can also be provided in a similar manner (e.g., "obstacle bodies" used to indicate where geometry should not be created). In some cases, the shape synthesis process takes place using a different representation of geometry than that employed by the CAD system. For example, a CAD system might use a boundary representation ("B-Rep") while the geometry generation engine might employ a level set function embedded in a voxel or tetrahedral mesh.

SUMMARY

This specification describes technologies relating to computer aided design of structures with feature thickness control, e.g., design of physical structures using generative design processes, where the three-dimensional (3D) models of the physical structures are produced in accordance with a design criterion that controls feature thickness in the generatively designed 3D shape, e.g., minimum feature size control. Other applications include generation of conceptual work or digital-only assets; an increase in minimum feature size can be driven by something other than manufacturability considerations, such as for an aesthetic reason or a desire to withstand un-modeled physics, such as buckling.

In general, one or more aspects of the subject matter described in this specification can be embodied in one or more methods (and also one or more non-transitory computer-readable mediums tangibly encoding a computer program operable to cause data processing apparatus to perform operations), including: obtaining, by a computer aided design program, a design space for a modeled object, for which a corresponding physical structure is to be manufactured, and one or more design criteria for the modeled object, wherein the one or more design criteria include a thickness specification for the modeled object; iteratively varying, by the computer aided design program, a three-dimensional shape of the modeled object in the design space in accordance with the one or more design criteria, wherein the iteratively modifying including controlling a thickness of the three-dimensional shape using the thickness specification by measuring thickness values for the three-dimensional shape during the iteratively varying, the measuring including preparing a voxelized sheet and line skeleton for the three-dimensional shape, and defining the thickness values for the three-dimensional shape using the voxelized sheet and line skeleton; and providing, by the computer aided design program, the three dimensional shape of the modeled object for use in manufacturing the physical structure using one or more computer-controlled manufacturing systems.

The preparing can include: computing a voxelized sheet skeleton for the three-dimensional shape; computing a voxelized line skeleton for the three-dimensional shape, wherein the voxelized line skeleton includes one or more line segments that connect different portions of the three-dimensional shape with each other; optionally removing outlying voxels from the voxelized sheet skeleton; and adding voxels of the voxelized line skeleton to the voxelized sheet skeleton to form the voxelized sheet and line skeleton for the three-dimensional shape. The modeled object can include one or more preserve regions specified for the three-dimensional shape, and the different portions of the three-dimensional shape can include the one or more preserve regions.

Removing the outlying voxels from the voxelized sheet skeleton can includes: removing voxels that are associated with sheet edges in the voxelized sheet skeleton for the three-dimensional shape; removing voxels forming one or more voxelized line skeleton portions of the voxelized sheet skeleton for the three-dimensional shape; or both removing the voxels that are associated with the sheet edges and removing the voxels forming the one or more voxelized line skeleton portions. The defining can include: translating the voxelized sheet and line skeleton into points that approximate a medial surface of the three-dimensional shape; and generating the thickness values using the points.

The points that approximate a medial surface can be a first set of points, the preparing can include keeping track of the voxels of the voxelized line skeleton that were not in the voxelized sheet skeleton before the removing of the outlying voxels from the voxelized sheet skeleton, and the generating can include generating the thickness values using a second set of points in addition to the first set of points, the second set of point being center points of the voxels of the voxelized line skeleton that were not in the voxelized sheet skeleton before the removing.

The three-dimensional shape of the modeled object can include a level-set representation of an implicit surface of the modeled object, and for each individual point of the first set of points that approximate the medial surface, the translating can include: casting a ray from a next voxel in the voxelized sheet and line skeleton but not included in the voxels of the voxelized line skeleton that were not in the voxelized sheet skeleton before the removing, or from a neighboring voxel of the next voxel; and estimating an extremum of values in the level-set representation along the ray within the three-dimensional shape.

The first set of points can include sheet points and line points, the method (or operations performed by the data processing apparatus in accordance with the computer program tangibly encoded in one or more non-transitory computer-readable mediums) can include performing a multi-directional search for the sheet points and performing a gradient-first search for the line points, wherein for the multi-directional search: the casting includes casting two or more rays in different directions from an initial point associated with the next voxel, wherein the two or more cast rays are optionally at least three orthogonal rays, which are optionally X, Y, Z directions in the design space; and the estimating includes for each of the two or more cast rays producing a near-side linear approximation of values in the level-set representation on a near side of the medial surface, producing a far-side linear approximation of values in the level-set representation on a far side of the medial surface, finding an intersection point of the near-side linear approximation with the far-side linear approximation, and a quality value for the intersection point, and selecting, based on the quality values for the intersection points, at least one of the intersection points, found for the two or more cast rays, to be in the first set of points. Further, for the gradient-first search: the casting includes casting a ray from the initial point in a direction corresponding to an upwind gradient computed from the neighboring voxel of the next voxel; and the estimating includes producing a near-side linear approximation of values in the level-set representation on a near side of the medial surface, producing a far-side linear approximation of values in the level-set representation on a far side of the medial surface, finding an intersection point of the near-side linear approximation with the far-side linear approximation, and a quality value for the intersection point, and using the intersection point as a line point in the first set of points when the quality value for the intersection point is sufficient, and performing the multi-directional search for the line point when the quality value for the intersection point is not sufficient.

The translating can include: finding a first set of points that approximate the medial surface of the three-dimensional shape; and changing locations and/or radiuses of the first set of points to smooth data values in the first set of points. The three-dimensional shape of the modeled object can include a level-set representation of an implicit surface of the modeled object, and the generating can include: forming a thickened level-set representation by performing a Boolean union of a sphere, for each of the points produced from the voxelized sheet and line skeleton, into a copy of the level-set representation of the implicit surface of the modeled object; and estimating the thickness values based on a difference between the level-set representation of the implicit surface of the modeled object and the thickened level-set representation. Moreover, the iteratively varying can include iteratively varying a three-dimensional shape and topology of the modeled object in the design space.

In general, one or more aspects of the subject matter described in this specification can also be embodied in one or more methods (and also one or more non-transitory computer-readable mediums tangibly encoding a computer program operable to cause data processing apparatus to perform operations), including: obtaining, by a computer aided design program, a design space for a modeled object, for which a corresponding physical structure is to be manufactured, one or more design criteria for the modeled object, and a thickness specification for the modeled object; iteratively varying, by the computer aided design program, a three-dimensional shape of the modeled object in the design space in accordance with the one or more design criteria, wherein the iteratively modifying includes performing a first set of two or more iterations following a second set of zero or more iterations, and wherein during the first set of two or more iterations, the iteratively varying includes modifying an amount of change indicated by a current numerical assessment of the modeled object, which is generated by numerical simulation, in each iteration of the first set of two or more iterations for use in updating a current version of the generatively designed three dimensional shape in the iteration; wherein the modifying includes, for each location of multiple locations in a current version of the generatively designed three dimensional shape, slowing a shape change, at the location, in a direction toward the thickness specification by an amount that is based on a difference between the thickness specification and a measured thickness at the location when the measured thickness complies with the thickness specification; and providing, by the computer aided design program, the three dimensional shape of the modeled object for use in manufacturing the physical structure using one or more computer-controlled manufacturing systems.

The iteratively varying can include iteratively varying both the three-dimensional shape and a topology of the modeled object in the design space in accordance with the one or more design criteria, wherein the modifying includes, for each location of multiple locations in a current version of the generatively designed three dimensional shape, forcing a shape change, at the location, in a direction toward the thickness specification when the measured thickness does not comply with the thickness specification, and optionally, wherein the forcing includes forcing a shape change in a direction toward the thickness specification by an amount that is based on a difference between the thickness specification and the measured thickness at the location.

The modifying can include, for each location of the multiple locations in the current version of the generatively designed three dimensional shape: estimating a prospected change in thickness at the location using either the slowed shape change or the forced shape change; and adjusting either the slowed shape change or the forced shape change using the estimated change in thickness at the location.

The second set can be a second set of one or more iterations, and the iteratively modifying can include performing a third set of two or more iterations between the second set of one or more iterations and the first set of two or more iterations, and wherein during the third set of two or more iterations, the iteratively varying including: for each location of multiple locations in a current version of the generatively designed three dimensional shape, slowing a shape change, at the location, in a direction toward the thickness specification when a measured thickness at the location is within a range of values, one side of the range of values being set by an adjustment control variable; and changing the adjustment control variable over the course of the third set of two or more iterations to move closer to the thickness specification.

The iteratively varying can include extending the first set of two or more iterations beyond an iteration at which the one or more design criteria are satisfied, in order to ensure no further forced shape changes are needed. The second set can be a second set of two or more iterations, and wherein no change in the amount indicated by the numerical assessment is performed based on the thickness specification during the second set of two or more iterations.

The iteratively modifying can include measuring thickness values for the three-dimensional shape, the measuring including: preparing a voxelized sheet and line skeleton for the three-dimensional shape; and defining the thickness values for the three-dimensional shape using the voxelized sheet and line skeleton. The thickness specification can be a maximum thickness value. The thickness specification can correspond to a thickness aspect ratio, and the thickness specification can be adjusted at the location based on a ratio of an assessed thickness at the location with respect to a length of a portion of the current version of the generatively designed three dimensional shape, the portion containing the location. The thickness specification can be a minimum thickness value. The measured thickness can comply with the thickness specification when the thickness at the location satisfies (i) the maximum thickness value, (ii) the thickness aspect ratio, or (iii) the minimum thickness value, with a buffer set in accordance with an estimate of thickness measurement error. Moreover, the slowing can be controlled by a first function, and the forcing can be controlled by a second function.

One or more aspects of the subject matter described in this specification can also be embodied in one or more systems including: a non-transitory storage medium having instructions of a computer aided design program stored thereon; and one or more data processing apparatus configured to run the instructions of the computer aided design program to perform any of the one or more methods described herein.

Particular embodiments of the subject matter described in this specification can be implemented to realize one or more of the following advantages. A generative design process can be adapted to produce shapes that are well suited to manufacturing, such as by imposing a minimum feature size constraint during generative modeling of a physical structure being designed. A minimum feature size requirement is applicable across a range of manufacturing processes, including (i) additive manufacturing, e.g., FFF, where there is a minimum resolution defined for a given additive manufacturing process, (ii) subtractive manufacturing, e.g., 3-axis milling, where features of the part need to withstand transient forces imposed on the part during the manufacturing process, and (iii) molding-based manufacturing, e.g., injection molding, where part feature size is limited by a physical requirement of the manufacturing process.

The thickness measurement algorithm can also be applied as an analysis on a shape to provide feedback to a designer or an algorithm in contexts where thickness is an important factor in the design (e.g., in preparing a part for injection molding). Further, in addition to facilitating part design and/or manufacturing, the shapes generated by a described generative design process can also enhance structural performance of the manufactured part, since thin features are susceptible to breakage due to unanticipated loads such as a drop or un-modeled buckling interactions, and the shapes can be generated for aesthetic reasons, such as to create digital assets, e.g., for use in film animation production. The described feature size constraint can correctly and smoothly thicken a sheet like region of a 3D model, without introducing surface defects.

The described processes for thickness control (e.g., during generative modeling) are not limited to minimum thickness control, but are also applicable to maximum thickness control and thickness aspect ratio control. A user can be provided one or more interface elements to specify such thickness control parameters as part of the generative design problem setup, which can improve user control over the shape generation process and result in more useful designs. These designs can be made more useful in terms of aesthetics (additional control over the output shape can be provided to the user), physical performance (improved robustness of the final parts), and/or manufacturing costs (e.g., minimum feature size control reduces manufacturing costs associated with special tooling).

In any case, the described approach to measuring thickness of an evolving shape being generatively designed can provide reduced use of processing resources while also reducing (or eliminating) the risk that the thickness measure will be undefined or inaccurate for a particular design at a particular location (the thickness control scheme can work robustly across a wide array of 3D models). Thus, the thickness measurement can be applied in a constraint formulation for the generative design process that increases robustness of the program. The thickness measurement can be applied to unrestricted solves during generative design.

Moreover, the control over thickness can be achieved (with or without using the described voxelized thinning based distance measurement) while also minimizing the risk that variations in part design will be unduly limited during optimization of the part's shape and/or topology by using a ramped scaling process for applying a thickness constraint. Noise can be reduced for the generated 3D model since the thickness constraint formulation does not require a measure of curvature, a computation which typically introduces noise into the results. Finally, because the thickness constraint is implemented as a filter, which can act implicitly on the velocity field, the constraint does not require an optimization framework that incorporates explicit constraints, making it more broadly applicable.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIGS. 2F and 2G show a process of ray casting and extremum estimation to refine a skeletal point to be closer to the medial surface of a 3D shape.

FIGS. 2H and 2I show a process used to find a voxel along a search direction as close as possible to the bottom of the valley of the signed distance field.

FIG. 3B shows how to define and compute upwind gradient in a level-set representation of a 3D model.

Like reference numbers and designations in the various drawings indicate like elements.

DETAILED DESCRIPTION

Figure 1A:
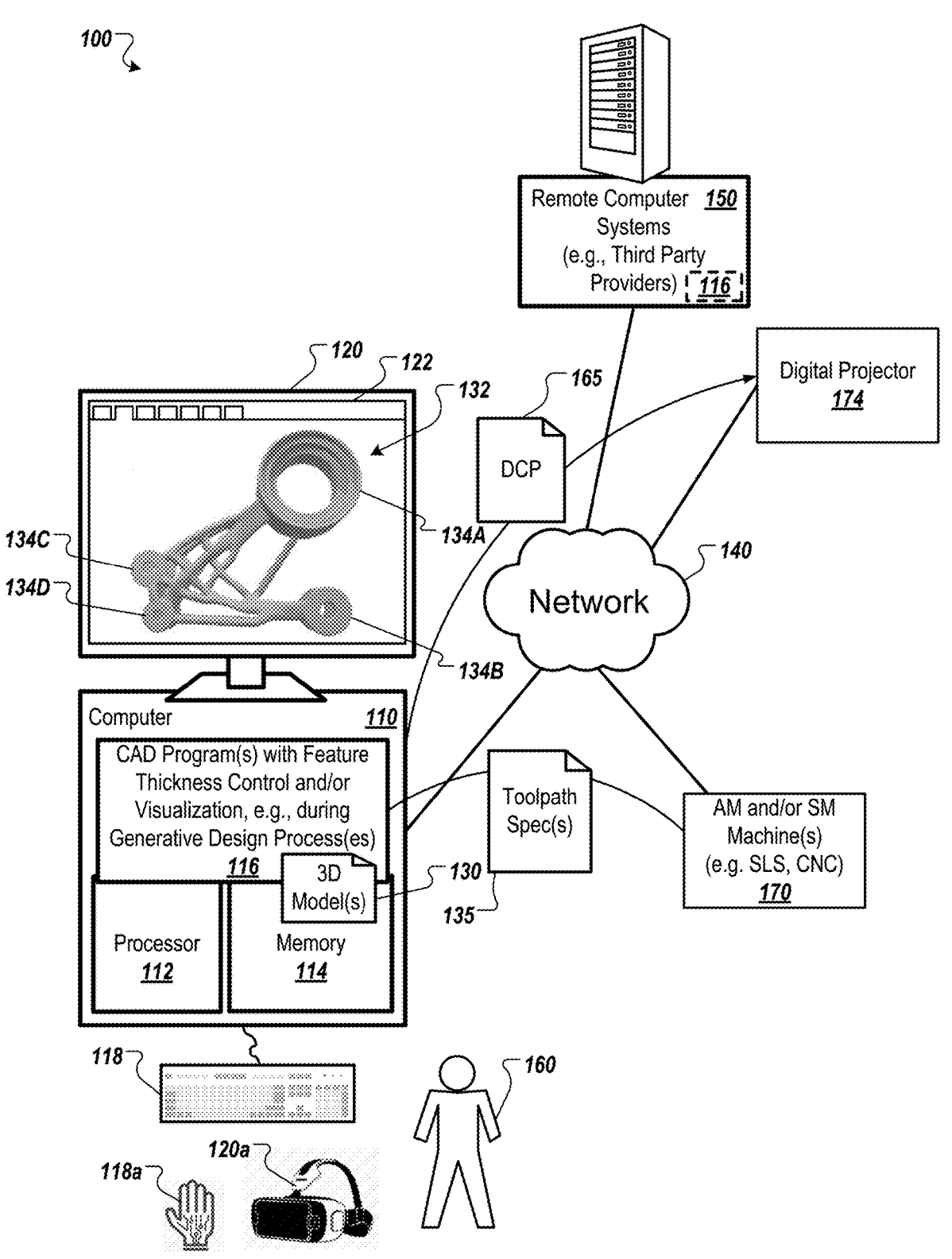
FIG. 1A shows an example of a system usable to facilitate computer aided design of structures with feature thickness control.

FIG. 1A shows an example of a system usable to facilitate computer aided design of structures with feature thickness control. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions and includes feature thickness control, which can be implemented as part of one or more generative design processes for topology optimization (e.g., using at least one level-set method as described).

In some instances, the numerical simulation performed by the systems and techniques described in this document can simulate one or more physical properties and can use one or more types of simulation to produce a numerical assessment of physical response (e.g., structural response) of the modeled object. For example, finite element analysis (FEA), including linear static FEA, finite difference method(s), and material point method(s) can be used. Further, the simulation of physical properties can include Computational Fluid Dynamics (CFD), Acoustics/Noise Control, thermal conduction, computational injection molding, electric or electromagnetic flux, and/or material solidification (which is useful for phase changes in molding processes) simulations. Moreover, the CAD program(s) 116 can potentially implement hole and/or fixture generation techniques to support clamping during manufacturing and/or manufacturing control functions.

As used herein, CAD refers to any suitable program used to design physical structures that meet design requirements, regardless of whether or not the program is capable of interfacing with and/or controlling manufacturing equipment. Thus, CAD program(s) 116 can include Computer Aided Engineering (CAE) program(s), Computer Aided Manufacturing (CAM) program(s), etc. The program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that one or more programs 116 operating locally at computer 110 can offload processing operations (e.g., generative design and/or physical simulation operations) "to the cloud" by having one or more programs 116 on one or more computers 150 perform the offloaded processing operations. In some implementations, all generative design operations are run by one or more programs in the cloud and not in a shape representation modeler (e.g., B-Rep modeler) that runs on the local computer. Moreover, in some implementations, the generative design program(s) can be run in the cloud from an Application Program Interface (API) that is called by a program, without user input through a graphical user interface.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1A, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) and/or augmented reality (AR) system. For example, the input/output devices 118, 120 can include a VR/AR input glove 118*a* and/or a VR/AR headset 120*a*. In any case, a user 160 interacts with the CAD program(s) 116 to create and modify 3D model(s), which can be stored in 3D model document(s) 130.

In the example shown in FIG. 1A, a 3D model 132 is a generatively designed model of an advanced consulting rocker, which has been produced using an iterative generative modeling process that employs systems and techniques described in this document to restrict the minimum thickness of any portion of the model 132 to be at least five mm thick. The generative modeling process can receive an initial 3D model as input, i.e., the starting shape (or "seed geometry"). In some implementations, the seed geometry includes one or more preserve regions, such as preserve bodies 134A, 134B, 134C, 134D. Boundary constraints can be defined with respect such preserve regions, and the starting shape for shape optimization (and optionally topology optimization) can be formed as the convex hull of the preserve regions or be specified by the user. The input preserve regions can be unconnected modeled solids or surfaces (e.g., user identified faces of modeled solids), and the generative design process is used to produce new 3D geometry that connects the input preserve regions, such as in the example of FIG. 1A. In general, a design space for generative design can be obtained by determining a bounding volume or a convex hull for an input model, or another technique can be used to obtain the design space, which is the volume of space inside which the part is to be designed during shape and/or topology optimization. In some cases, the user may explicitly specify the design space.

In some implementations, the user 160 can define a topology optimization problem for a generative design process to produce a desired 3D model from a starting 3D model, or the input can be a design space without a specific starting 3D model. In general, the input design space can be automatically generated or user specified. Note that the generative design process itself can produce starting geometry within the design space. For example, one or more seed models can be used as input to the generative design process to introduce holes at the start of the shape evolution so as to modify the topology of the generative design.

In some implementations, the shape (and optionally topology) of a modeled object is produced using generative design processes or generative modeling that employs an efficient and robust process of measuring thickness values used to control the thickness of the modeled object that is produced. In some implementations, the process of measuring thickness is used outside of the context of controlling thickness during generative design. For example, the thickness measurement process can be used to provide visualization of part thickness in the UI 122 on the display 120, e.g., for use in additive or injection molding manufacturing preparation software.

In some implementations, the topology and shape of a modeled object is produced using generative design processes or generative modeling that employs a thickness constraint enforced with a scaling ramp, where shape changes are slowed as they approach a thickness specification for the part, e.g., using localized filtering of advection velocities generated from a numerical assessment produced by numerical simulation of the modeled object. In some implementations, shape changes are also forced when the thickness specification is violated. In general, using thickness control (e.g., a minimum thickness constraint) during shape and/or topology optimization can guide the generative design process to produce a final shape for the design that facilitates manufacturing of the physical structure, where this can be done using an algorithm that is efficient and robust, and that can assist the generative design solver in finding design outcomes that achieve the desired physical characteristics using less material and/or less complex designs.

Thus, the CAD program(s) 116 can implement at least one generative design process, which enables the CAD program(s) 116 to generate one or more portions of the 3D model(s) (or the entirety of a 3D model) automatically based on design objective(s) and constraint(s), i.e., design criteria, where the geometric design can be iteratively optimized based on simulation feedback (e.g., based on a numerical, physics simulation). In some instances, multiple 3D models can be co-created by one or more generative design processes and can be assembled to form a new 3D model. Note that, as used herein, "optimization" (or "optimum") does not mean that the best of all possible designs is achieved in all cases, but rather, that a best (or near to best) design is selected from a finite set of possible designs that can be generated within an allotted time, given the available processing resources.

The design criteria can be defined by the user 160, or by another party and imported into the CAD program(s) 116. The design criteria can include a geometric objective that drives the shape (and optionally topology) evolution using an iterative numerical simulation process, with or without physics/physical response simulations. The design criteria can also include physics objectives for the evolution of the structure of the 3D model. For example, a geometric objective can correspond to a pseudo-physical response of the 3D model. In some implementations, the generative design process can be a structural generative design process that can be associated with boundary conditions, which can specify in-use load case(s) of the physical structure. In some instances, the boundary conditions can be pressure and velocity boundary conditions. In some implementations, the design criteria can include structural integrity constraints for individual parts (e.g., a requirement that a part should not fail under the expected structural loading during use of the part) and physical constraints imposed by a larger system (e.g., a requirement that a part be contained within a specified volume so as not to interfere with other part(s) in a system during use).

Various generative design processes can be used, which can optimize the shape and topology of at least a portion of the 3D model. The optimization of the geometric design of the 3D model(s) by the CAD program(s) 116 can involve topology optimization, which is a method of light-weighting where the optimum distribution of material is determined by minimizing an objective function subject to design constraints (e.g., structural compliance with volume as a constraint). There are two primary categories of topology optimization, density-based approaches and boundary-based approaches. Density-based approaches discretize the volume of the part, and assign a density to each discrete cell, such as in a Solid Isotropic Material with Penalization (SIMP) method. Then the densities are driven toward solid and empty while minimizing the objective(s) subject to the constraints. Boundary-based approaches instead track the shape of the external interface of the solid part and move the boundary such that the constraints are satisfied and the objective(s) are minimized, such as in a level-set method.

In some implementations, a generatively designed 3D shape of a modeled object has a level-set representation used during generative modelling of the object. The generatively designed 3D shape of the object can be varied using topology optimization to update the level-set representation in accordance with shape change velocities based on numerical simulation evaluation. A level-set representation method can be used to track the boundary of the shape of the modeled object during topology optimization, which has the advantages of providing precise knowledge of the boundary, and allowing topological changes as the surface evolves without the need for re-meshing. In any case, note that the shape synthesis process can (and often will) be done using a different representation of geometry than that employed by the CAD program(s) 116 for 3D modelling. For example, the CAD program(s) 116 can use a B-Rep model for the input geometry 134A, 134B, 134C, 134D, while the geometry generation engine in the generative design process (e.g., in CAD program(s) 116) can employ a level-set function embedded in a voxel or tetrahedral mesh.

Once the user 160 is satisfied with a generatively designed 3D model 132, the 3D model 132 can be stored as a 3D model document 130 and/or used to generate another representation of the model (e.g., toolpath specifications for a manufacturing process). This can be done upon request by the user 160, or in light of the user's request for another action, such as sending the generatively designed 3D model 132 to a manufacturing machine, e.g., additive manufacturing (AM) machine(s) and/or subtractive manufacturing (SM) machine(s) 170, or other manufacturing machinery, which can be directly connected to the computer 110, or connected via a network 140, as shown. This can involve a post-process carried out on the local computer 110 or externally, for example, based on invoking a cloud service running in the cloud, to further process the generated 3D model (e.g., based on considerations associated with the additive manufacturing process) and to export the 3D model to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files. In addition, the user 160 can save or transmit the 3D model for later use. For example, the CAD program(s) 116 can store the document 130 that includes the generated 3D model.

The CAD program(s) 116 can provide a document 135 (having toolpath specifications of an appropriate format) to an AM and/or SM machine 170 to produce a physical structure corresponding to at least a portion of the 3D model 132. An AM machine 170 can employ one or more additive manufacturing techniques, such as granular techniques (e.g., Powder Bed Fusion (PBF), Selective Laser Sintering (SLS) and Direct Metal Laser Sintering (DMLS)) or extrusion techniques (e.g., Fused Filament Fabrication (FFF), metals deposition). In some cases, the AM machine 170 builds the physical structure directly, and in some cases, the AM machine 170 builds a mold for use in casting or forging the physical structure.

An SM machine 170 can be a Computer Numerical Control (CNC) milling machine, such as a multi-axis, multi-tool milling machine used in the manufacturing process. For example, the CAD program(s) 116 can generate CNC instructions for a machine tool system 170 that includes multiple tools (e.g., solid carbide round tools of different sizes and shapes, and insert tools of different sizes that receive metal inserts to create different cutting surfaces) useable for various machining operations. Thus, in some implementations, the CAD program(s) 116 can provide a corresponding document 135 (having toolpath specifications of an appropriate format, e.g., a CNC numerical control (NC) program) to the SM machine 170 for use in manufacturing the physical structure using various cutting tools, etc. Note that the milling process can limit the types of shapes that can be manufactured because the milling machine must be able to hold the part rigidly and the rotary bit must be able to access the material surface without interference. Other important considerations that should to be taken into account are vibration of the part during material removal and stresses on the bit itself by the milling process.

A shape and/or topology optimization process used by the CAD program(s) 116 can reduce or remove barriers that keep optimized geometry solutions from being directly manufactured or otherwise utilized in downstream design activities by ensuring a minimum thickness for portions of the structure and/or by reducing the complexity of the design for the structure. This can facilitate manufacturing by AM and/or SM processes by ensuring that the performance requirements are met for the produced structure, while also taking into account the cost and manufacturability of the geometries synthesized in the automated design process. This can be done using an algorithm that is efficient and robust, and that can assist the generative design solver in finding design outcomes that achieve the desired physical characteristics using less material and/or less complex designs.

Further, in some implementations, the CAD program(s) 116 provide instructions to build a workpiece in a first stage of manufacturing, e.g., using direct AM and/or using forging and/or casting methods, and the CAD program(s) 116 also provide instructions to machine the workpiece, e.g., roughing and/or finishing operations, in a second stage of manufacturing, e.g., in a 3-axis CNC milling system, in order to form the completed structure. In general, various different manufacturing systems and techniques can be employed, either alone or in combination, to produce a final structure, and the CAD program(s) 116 can include suitable algorithms to generate toolpath specifications 135 for one or more of these various systems to manufacture a part that has been designed using the systems and techniques described in this application.

In addition, in some implementation, no physical manufacturing is involved. The systems and techniques described herein are applicable to any suitable 3D modelling software. Thus, in some implementations, the CAD program(s) 116 can be animation production program(s) that render the 3D model 132 to a document 165 of an appropriate format for visual display, such as by a digital projector 174 (e.g., a digital cinema package (DCP) 165 for movie distribution) or other high resolution display device. Other applications are also possible.

Nonetheless, in various implementations, the CAD program(s) 116 of the system 100 implement one or more generative design processes as described in this document. Generative design processes seek an optimal geometric shape, topology, or both. For example, generative design processes seek an optimal geometric shape among alternative designs by minimizing a performance-related objective function subject to constraints:

$$\text{minimize } J(s, u(s)) s \in \mathbb{R}^{n_s} \tag{1}$$

$$\text{such that } g_i(s, u(s))=0 \ i=1, \ldots, n_g \tag{2}$$

where s is a vector of design variables related to a geometric shape of the domain, and u is a vector of state variables (e.g., displacement) that depend on s. Additional constraints (e.g., equilibrium) are denoted by a set $g_i$. For simplicity, equality constraints are assumed here. Mathematical programming methods used to minimize Equation (1) can be gradient-based or non-gradient-based. Gradient-based methods (versus non-gradient-based methods) generally use more information associated with design sensitivity, for example:

$$\frac{dJ}{ds}(s, u(s)) = \frac{\partial J}{\partial s} + \frac{\partial J}{\partial u}\frac{du}{ds} \tag{3}$$

which is a derivative of the performance-related objective function with respect to the design variables. In level-set based topology optimization methods, s represents a boundary of a solid region.

Figure 1B:
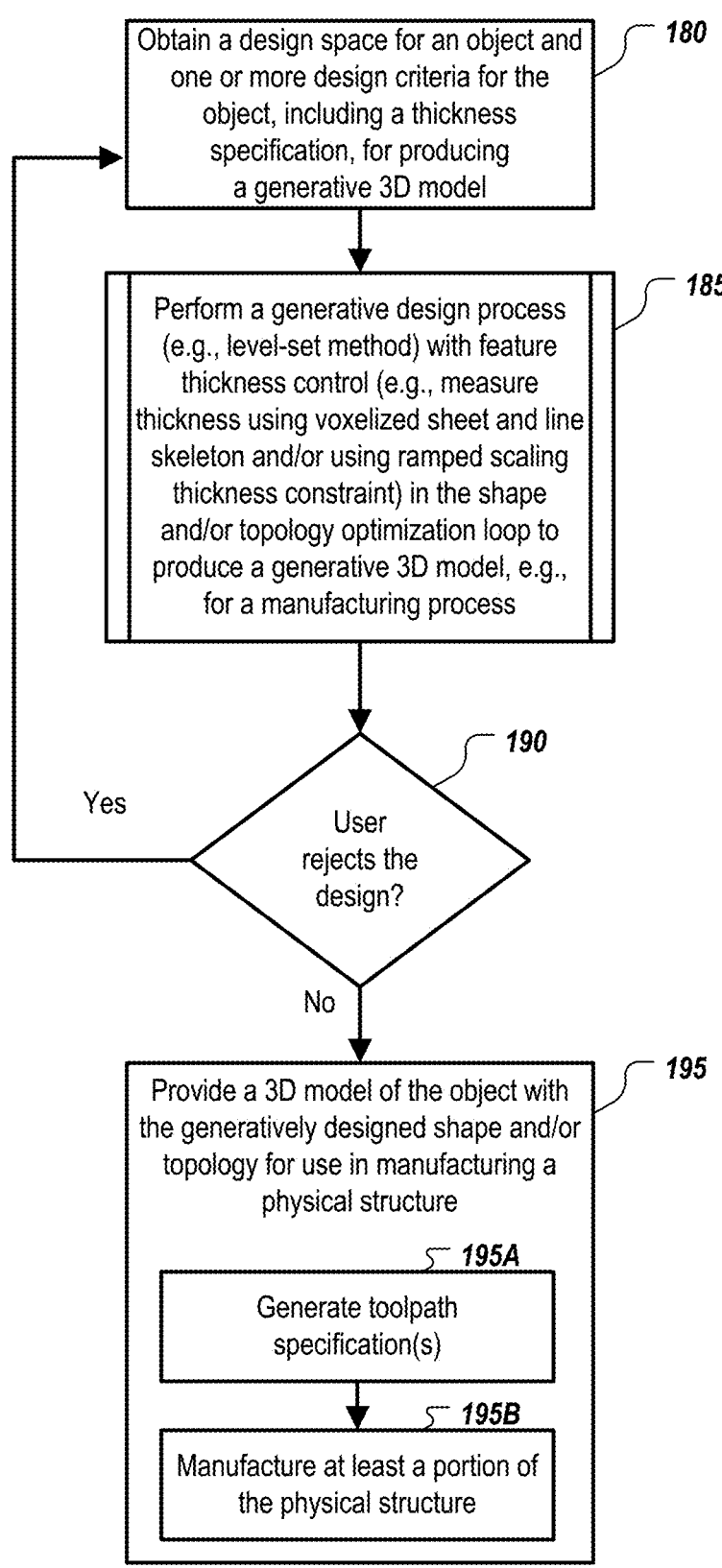
FIG. 1B shows an example of a process of generative design with feature thickness control.

FIG. 1B shows an example of a process of generative design with feature thickness control. A design space for a modeled object and one or more design criteria are obtained 180, e.g., by CAD program(s) 116, for use in producing a generative 3D model. The design space for the modelled object is the volume inside which the part is to be designed. The design space can include a bounding volume containing an initial specification of one or more outer shapes of the 3D topology for the object. As noted above, the design space can include 3D model(s), designed in or loaded into the CAD program(s) 116, that serves as a sub-space of an optimization domain of a described generative design process, and/or a set of input regions, e.g., preserve bodies and/or surfaces, used to specify boundary conditions for generative design geometry production, e.g., B-Reps (or faces thereof) selected by a user through a user interface, such as the UI 122, to specify sub-region(s) that are preserved for use as connection point(s) with other component(s) in a larger 3D model or separate 3D model(s).

The design criteria can include design objective(s) and design constraint(s) for the object. Design objectives can include but are not limited to minimizing waste material, minimizing the weight of the part, and minimizing the compliance, stress, or other intrinsic property of the part, and are used to drive the shape synthesis process towards better designs. Though not required, it is typical for a design objective to be rooted in a simulation of the design (linear static, fluid dynamic, electromagnetic, etc.). Design constraints can include a variety of geometric and physical characteristics or behaviors that should be met in any generated design (requirements either on individual parts or on the entire assembly are also admissible); examples include maximum mass, maximum deflection under load, maximum stress, etc.

The design criteria can also include geometric objectives for the shapes and geometric constraints. The geometric constraints can be provided by a user or from the CAD program(s) 116 to ensure certain characteristics of the shape are realized, e.g., to provide a shape that is easier to manufacture. For example, the geometric constraints can be defined to ensure that the generated shape can have no tiny features. The input geometry can include details for preserve regions that should be present in the design as representing interfaces to other parts of the system, or identify locations on which boundary conditions should be applied (e.g., mechanical loads and constraints).

Further, different generative design processes can be formulated by using different combinations of design parameters and design variables. In some implementations, the design parameters can include various types of inputs, e.g., received through UI 122, such as selection among different generative design synthesis methods made available by CAD program(s) in the system 100. In some implementations, the available generative design synthesis methods can include a level-set-based topology optimization that provides a basic level-set method for topology optimization. Other generative design synthesis methods are also possible and can be provided by CAD program(s) in the system 100. Different combinations of design parameters and design variables can be used, e.g., by CAD program(s) 116 in response to input from the user 160. For example, a user 160 may select different generative design synthesis methods to use within respective different design spaces within a single 3D model.

The obtained 180 one or more design criteria can include one or more in-use load cases (e.g., one or more boundary conditions that specify one or more in-use load cases) for the physical structure to be manufactured from the generatively designed part. The one or more in-use load cases can be associated with a setup for numerical simulation, e.g., densities of elements in an FEA model to be used with an optimized 3D topology of the part being generatively designed. However, as used herein, "in-use load cases" refer generally to separate groups of loads and constraints under which part performance is evaluated and correspond to sets of boundary conditions for various types of physics simulations, such as fluid flow simulation, electro-magnetic (EM) behavior simulation, multiphysics simulation, etc. Thus, various types of boundary conditions, e.g., pressure and/or velocity boundary conditions, can be used.

In general, the setup for numerical simulation can include one or more physical properties to be simulated and one or more types of simulation to be performed, as well as potentially surrogate modelling or other methods of approximation. In some implementations, the type of numerical simulation is predefined, either for all uses of the program or given a particular context in the program from which the generative design process has been launched. Further, the setup for numerical simulation can include at least one set of loading conditions and/or other physical environment information associated with the type of numerical simulation to be performed.

Finally, the obtained 180 one or more design criteria can include a thickness specification for the modeled object. In some cases, the thickness specification is a minimum thickness value, which indicates the smallest acceptable thickness for the 3D model to be generated. In some cases, the thickness specification is a maximum thickness value, which indicates the largest acceptable thickness for the 3D model to be generated. In some cases, the thickness specification corresponds to a thickness aspect ratio, which indicates the smallest acceptable ratio of local thickness to a length of a portion of the 3D model in the area of that local thickness.

With the generative design space and design criteria specified, one or more 3D model(s) are produced 185, e.g., by CAD program(s) 116, using one or more generative design processes. In some implementations, the produced 3D model(s) can be designed for use in additive manufacturing, subtractive manufacturing (e.g., manufactured using a 2.5-axis subtractive manufacturing process), and/or other manufacturing systems and techniques, as described above. The one or more generative design processes performed, e.g., by CAD program(s) 116, can include a boundary-based generative design process (e.g., using a level-set method) of topology optimization, a density-based generative design process (e.g., using a SIMP method), or both.

In some implementations, the one or more generative design processes can use the described level-set methods, where s, from equations (1), (2) and (3), represents a boundary of a solid region that is implicitly represented using one or more level-sets, which can be stored as sampled values on a background grid or mesh. A signed distance field is an example of such a level set function, where the zero-contour represents the shape boundary, positive values of the function correspond to points exterior to the material domain and quantify the distance between the point and the nearest domain surface, and negative values correspond to points interior to the material domain and quantify the distance between the point and the nearest domain surface. In a level-set-based topology optimization method, the outer shape of a structure is represented by a contour of the level set function, and a change in shape and configuration is represented by a change in the level set function values.

In any case, the production 185 of the 3D model(s) involves iteratively modifying, e.g., by CAD program(s) 116, a generatively designed 3D shape of the modeled object with feature thickness control, based on the thickness specification. This can include modifying both a geometry of the 3D shape and a topology of the 3D shape (e.g., adding holes or voids to modify the spatial properties of the surface that are unaffected by continuous deformation without tearing, thus changing how shape elements are bounded and connected in the 3D model). In some implementations, the production 185 of the 3D model(s) includes measuring thickness in the 3D model using a voxelized sheet and line skeleton. In some implementations, the production 185 of the 3D model(s) includes using a ramped scaling based thickness constraint, using the voxelized sheet and line skeleton approach to thickness measurement or using another approach to thickness measurement. In any case, the result is at least one generative 3D model, e.g., for use in connection with a manufacturing process.

The result of generative design processing can be presented to the user, e.g., in UI 122 on display device 120, along with an option 190 to accept or reject the design. For example, a 3D model produced by the generative design processing 185 can be presented to the user 160 in UI 122. In some implementations, the user can select from the final design or any of a variety of previous iterations for each design study. In some implementations, two or more 3D models resulting from the generative design process can be presented to the user along with trade-off analysis of design complexity versus cost of manufacturing, e.g., based on the amount of external support structure that will be needed, or any of a variety of other quantities of interest. The trade-off analysis can assist a user 160 to accept or reject one or more 3D models among the presented 3D models.

If the design is rejected, the process of FIG. 1B can return to obtain 180, e.g., by CAD program(s) 116, new design space and/or new design criteria for use in producing a new generative 3D model. Once a design is not rejected 190, the process of FIG. 1B can provide 195, e.g., by CAD program(s) 116, the 3D model of the object with the generatively designed shape and/or topology for use in manufacturing a physical structure. The providing 195 can involve sending or saving the 3D model to a permanent storage device for use in manufacturing the physical structure corresponding to the object using manufacturing systems. In some implementations, the providing 195 involves generating 195A, e.g., by CAD program(s) 116, toolpath specifications for computer-controlled manufacturing system(s) using the 3D model, and manufacturing 195B, e.g., by CAD program(s) 116, at least a portion of the physical structure corresponding to the object with the computer-controlled manufacturing system(s) using the toolpath specifications. In some implementations, the providing 195 can include manufacturing 195B a mold for a physical structure with a manufacturing machine using the toolpath specification generated 195A, where the 3D model can be a model of the mold that will be manufactured using a subtractive manufacturing process.

The 3D model that is provided 195 can be the 3D model produced 185 by a generative design synthesis method or a post-processed version of the generative design output. In some implementations, a polygon mesh, which can be extracted from the output from a boundary-based generative design process, or generative design data obtained directly from the boundary-based generative design process, can be converted into a boundary representation (B-Rep) model and/or a parametric feature model, e.g., by CAD program(s) 116. For example, generative design data can be level-set distance field data obtained directly from the boundary-based generative design process. The boundary representation model or the parametric feature model can be editable as sketch geometry and parametric features. For example, in some implementations, a 3D mesh model produced by a generative design synthesis method can be converted into a watertight B-Rep 3D model, before being provided 195.

Figure 1C:
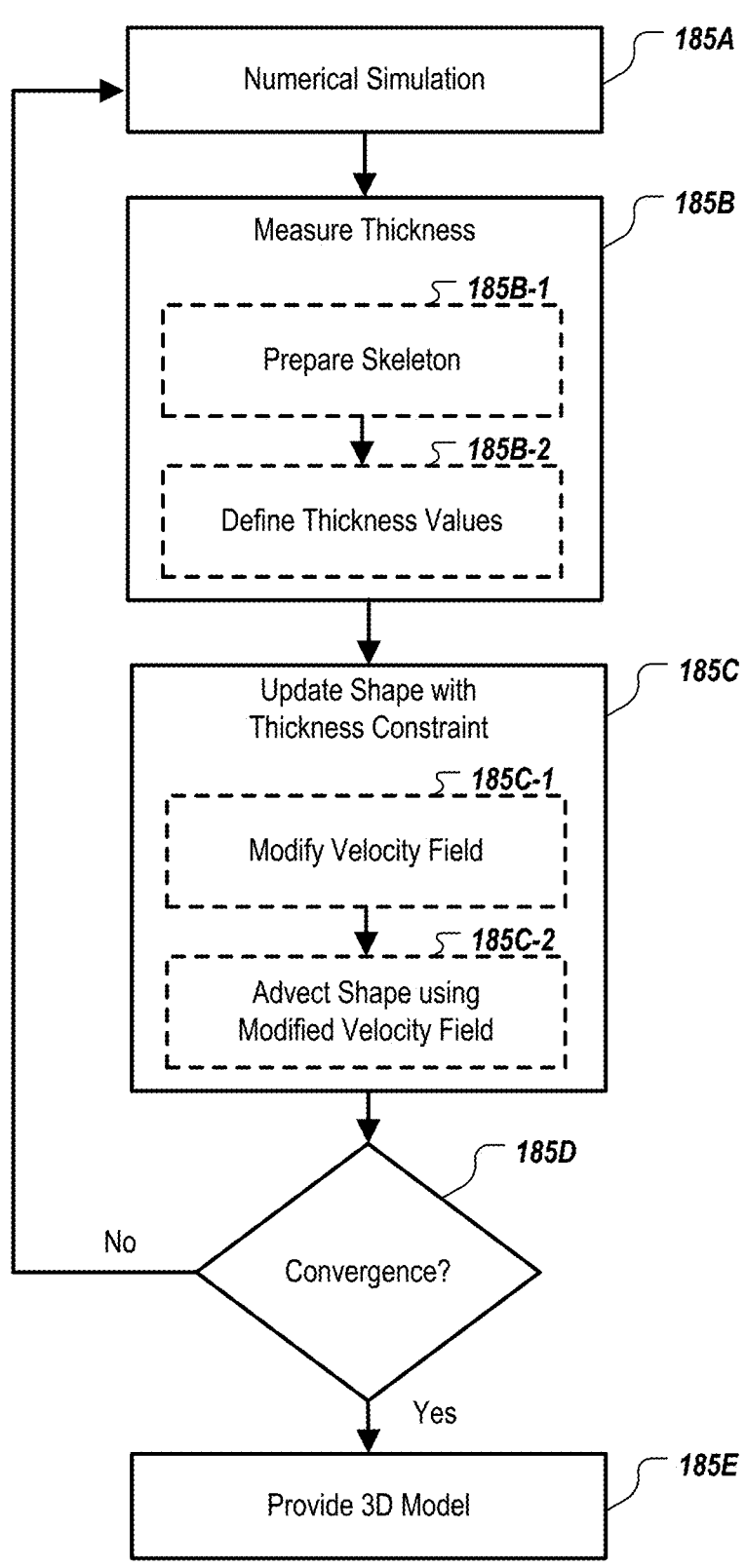
FIG. 1C shows an example of an iterative loop in a process of generative design with feature thickness control.

FIG. 1C shows an example of an iterative loop in a process of generative design with feature thickness control. This example represents topology optimization performed in the defined process 185 of FIG. 1B. Numerical simulation is performed 185A for a current 3D model of the object (e.g., level set representation of an implicit surface of a 3D shape) in accordance with the one or more design criteria to produce a current numerical assessment of the modeled object. As noted above, the design criteria can include boundary conditions that can define in-use load cases or other requirements (e.g., pressure and velocity boundary conditions, a geometric objective for topology evolution, etc.), and the current numerical assessment can be for the physical response (e.g., structural response) of the modeled object. Further, as noted above, various types of numerical simulation can be performed. For example, an FEA simulation can compute strain energy everywhere inside the volume of the current version of the 3D model. In any case, numerical simulation of the current 3D model produces a current numerical assessment that can then be used to change the shape and topology of the current 3D model in view of the design criteria.

In addition, the thickness of the current 3D model is measured 185B. Note that the thickness measurement 185B can create thickness values at many different locations on or in the current 3D model, and need not come after (or be separate from) the numerical simulation 185A. In some implementations, the thickness measurement 185B is integrated with the numerical simulation 185A. Further, the thickness measurement 185B can produce a thickness value for the current 3D model at each surface location of the current 3D model that can be changed in response to the numerical simulation 185A, e.g., estimating the local thickness of the shape for each point on the surface. In some implementations, one or more of the following thickness measuring techniques are used: (1) ray casting techniques, (2) a largest fitting sphere search, (3) a rolling ball technique, and (4) a Laplacian-based distance to medial axis calculation.

In some implementations, a voxelized thinning based distance to medial surface process is used. In such processes, a voxelized sheet and line skeleton is prepared 185B-1 for the three-dimensional shape of the current 3D model. In some cases, this involves preparing 185B-1 a sheet skeleton and a critical line skeleton in a single pass using an appropriate erosion algorithm that does not remove loops or portions of the line skeleton that connect preserve regions. In some cases, this involves preparing 185B-1 a sheet skeleton and a critical line skeleton in a two-step process, such as described below in connection with FIG. 2A. Also, note that the dimensions/resolution of the voxels used to generate thickness values can be the same or different than the dimensions/resolution of any voxels used during the numerical simulation 185A.

Moreover, thickness values can be defined 185B-2 for the three-dimensional shape using the voxelized sheet and line skeleton. This can involve translating the voxelized sheet and line skeleton into points that approximate a medial surface of the three-dimensional shape, and generating the thickness values using these points. For example, for each voxel in a skeletal sheet, a point that is closer to a true medial surface of the three-dimensional shape than a center of that skeletal sheet voxel can be found by doing an approximation using a level-set representation, such as a signed distance field, as described in further detail below. In some implementations, generating the thickness values using these refined skeletal points involves searching for the skeletal point that is closest to the surface point for which a thickness is needed, and then either using the radius (or twice the radius) of that closest skeletal point as the thickness at the surface point, or calculating a distance (or twice the distance) between the surface point and that closest skeletal point, as described in further detail below in connection with FIGS. 2A-2L.

The 3D shape of the 3D model is updated 185C with the thickness constraint taken into account. In general, the numerical assessment from the numerical simulation 185A indicates some amount of change at various locations in the 3D model (e.g., at locations on the surface of a 3D shape of the 3D model) in order to improve the 3D model with respect to the design criteria, and this indication is used as the basis for the shape update 185C. For example, in some implementations, the generatively designed 3D shape of the modeled object includes a level-set representation of an implicit surface of the modeled object, and the updating 185C includes updating the level-set representation in accordance with shape change velocities computed for the implicit surface based on the current physical assessment. For example, the strain energy field inside the volume (as determined by the numerical simulation) can be transformed into a velocity field on the surface of the volume, where the velocity at each point moves the geometry towards a more optimal shape, and the 3D shape can be advected to update the shape by moving each piece of the boundary according to its velocity. Further, the 3D shape of the modeled object can be represented in different formats during different processing stages, such as representing the 3D shape using a grid of cubic voxels for simulation, using an implicit shape for shape update, and using a polygonal mesh for export of the generative design.

In any case, the shape update 185C takes the thickness constraint into account. Various approaches can be used in various implementations, including: (1) using a shape derivative that accounts for the thickness specification when transforming the numerical assessment from the simulation 185A into a velocity field on the surface of the shape/volume of the 3D model, (2) using heuristics (e.g., surface mesh based heuristics) for filtering the velocity field, and (3) sensitivity or geometry filtering. In general, applying a thickness constraint involves mapping the measured thickness values to some change in the optimization process, e.g., to penalize and/or remove too-thin regions of the generative design.

In some implementations, the velocity field (which specifies the amount of change indicated by the current numerical assessment of the modeled object) is modified 185C-1, and the shape of the 3D model is then advected 185C-2 using modified velocity field. In general, the process maps the thickness measured at each point on the boundary of the shape to a change in the velocity field on each iteration of the shape optimization. At a minimum, the modifying 185C-1 includes slowing a shape change (at each of multiple locations in a current version of the generatively designed three dimensional shape) in a direction toward the thickness specification by an amount that is based on a difference between the thickness specification and a measured thickness at the location when the measured thickness complies with the thickness specification. For example, for a minimum thickness constraint, the process can slow the shrinkage of features that are already near the minimum feature size and stop shrinkage of such features when they reach the minimum feature size. In addition, the process can grow features that are smaller than the minimum feature size cutoff. Further details regarding a ramped scaling process for applying a thickness constraint are provided below in connection with FIGS. 4A and 4B.

After each iteration of the shape modification loop is completed, the process checks 185D for convergence to a final shape. This can be implicit convergence, as when the number of iterations corresponds to a predefined number of shape modification iterations to be completed, and/or when the modifications are no longer changing (or no longer significantly changing) the 3D shape and so further iterations will not improve the 3D model. Additionally or alternatively, the check 185D can be for explicit convergence by evaluating whether the current 3D model satisfies the design criteria for the shape and/or topology optimization. If (implicit or explicit) convergence 185D has not been achieved, another iteration of the optimization loop commences. Once (implicit or explicit) convergence 185D has been achieved, the generatively designed 3D model of the object is provided 185E, e.g., for use in manufacturing.

Figure 2A:
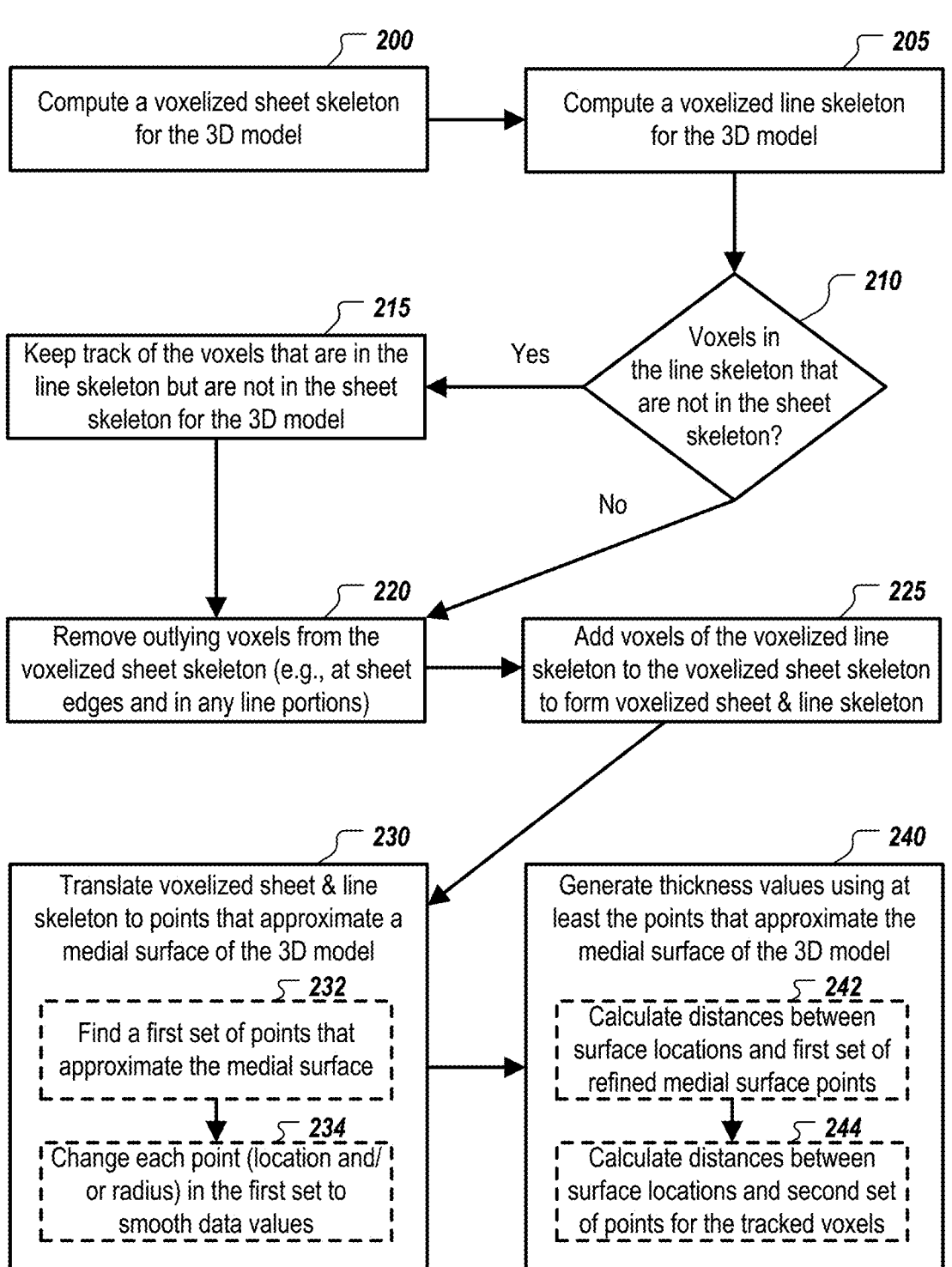
FIG. 2A shows an example of a voxelized thinning based distance to medial surface process for measuring thicknesses in a 3D model.

FIG. 2A shows an example of a voxelized thinning based distance to medial surface process for measuring thicknesses in a 3D model. A voxelized sheet skeleton for the three-dimensional shape is computed 200. This can be done using a thinning algorithm (such as described in *Building Skeleton Models via 3-D Medial Surface/Axis Thinning Algorithms*; Lee, Ta-Chih and Kashyap, Rangasami; 6, s.l.: Academic Press, Inc., 1994; CVGIP: Graphical Models and Image Processing, Vol. 56, pp. 462-478, hereafter the "Lee and Kashyap algorithm") designed to compute a voxelized medial surface. The voxelized medial surface is a rough approximation of a medial surface of the 3D shape. Conceptually, a medial surface (also called a "sheet skeleton") is the set of points equidistant from two or more closest points on the shape boundary.

Figure 2B:
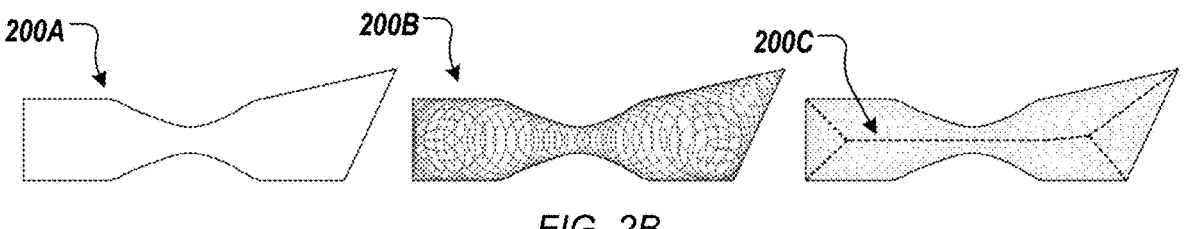
FIG. 2B shows an example of a medial axis of a shape.

FIG. 2B shows an example of a medial axis of a shape 200A. This example is in two dimensions for ease of presentation, but it will be appreciated that the medial axis of a shape in 2D corresponds to the medial surface of a shape in 3D, with 2D circles being replaced by 3D spheres. One can find the medial axis visually by creating a set of circles 200B that are tangent to the boundary of the shape in two or more places and contained entirely inside the shape. The center of such a circle is a point equidistant from two points on the boundary of the shape, so the set of centers 200C of inscribing circles is equivalent to the medial axis of the shape. Likewise, the set of spheres (that are tangent to the boundary of a 3D shape in two or more places) is equivalent to the medial surface of the 3D shape.

Once the medial surface is established, the thickness on the shape boundary can be computed by examining the diameter of the sphere that touches that point on the boundary. However, finding an approximate medial surface of a 3D shape in a computationally efficient and robust manner is not straightforward, especially when the 3D shape is evolving in an iterative optimization process, and in some cases has very complex topology. In order to provide a robust algorithm that provides high quality results in a computationally efficient manner, several factor must be taken into consideration.

Figure 2C:
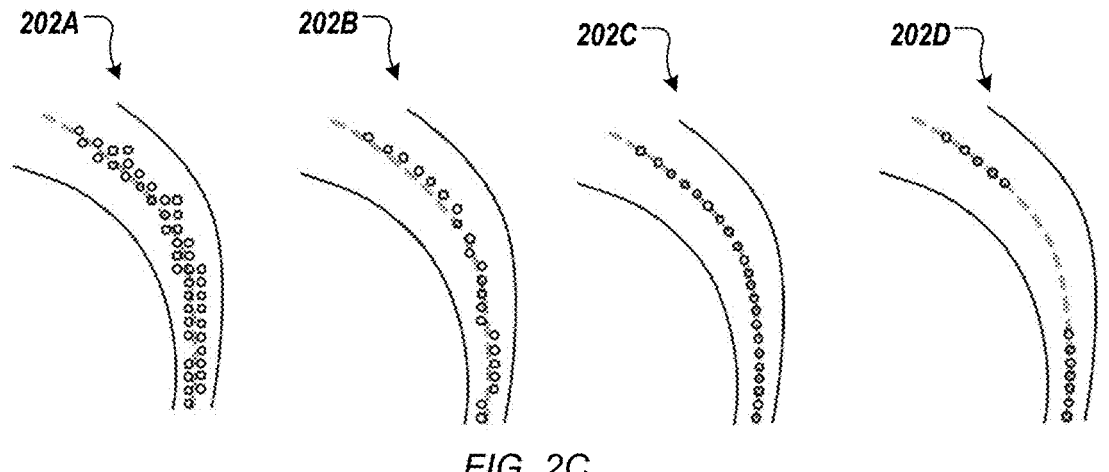
FIG. 2C shows examples of approximations of a medial surface of a shape.

First, the approximation of the medial surface should consist of as few points as necessary to adequately cover the actual medial surface. FIG. 2C shows examples of approximations of a medial surface of a shape (represented in 2D for ease of presentation). In FIG. 2C, the shape is represented by solid lines, the actual medial surface is represented by a dashed line, and the approximation of the medial surface is represented by small circles. Comparing example 202A with 202B, note that that example 202A has many more data points (small circles) for the approximation than example 202B. Thus, example 202B is preferable over example 202A with respect to the first consideration in that example 202B has a relatively thin approximation of the medial surface that still adequately covers the medial surface.

A second consideration is that the data points of the approximation should be positioned equidistant from the corresponding boundaries on the shape. Thus, example 202C is preferable over example 202B since the data points of the approximation more accurately track the actual medial surface. But a third consideration is that the approximation should be "continuous" in the sense that there are no gaps/holes or missing regions. Thus, example 202D is not acceptable since it includes a region that is missing data points to approximate the medial surface of the shape. These considerations create a tradeoff in that the efforts taken to produce a medial surface approximation that is both highly accurate and thin can also increase the chances of gaps and holes being left in the medial surface approximation or even entirely missing regions.

This can be critical in the context of shape and/or topology optimization. Using a medial surface approximation that includes gaps and holes can lead to surface noise, and can reduce the quality of the produced 3D shape, and can introduce undetected violations of the thickness constraint. Using a medial surface approximation with missing regions can cause beams to break, thus preventing the generative design process from finding an optimal topology. Moreover, two additional considerations come into play when using a medial surface approximation based thickness measurement during topology optimization.

In some implementations, the thickness measurement is designed to reject "unimportant" features of the shape, which might cause artifacts to be frozen and retained instead of disappearing over time as the topology optimization proceeds. For example, in the context of mechanical compliance minimization, when the 3D model includes one or more "fingers", which are protrusions from the shape that do not connect to anything else and so cannot serve as a load path, the topology optimization process should remove these portions of the 3D shape, and the thickness measurement process should not prevent this from happening. Further, the thickness measurement can be designed to differentiate between the two faces of a thin sheet of material in the current 3D shape and the edges of that thin sheet of material. For example, when a minimum thickness constraint is used, the two faces of a thin sheet of material should be prevented from getting closer to each other, but the sheet edges should be free to move in each iteration of shape change. Note however that "unimportant" features for the shape can vary with the context of application of the thickness measurement process; and in some implementations, rejecting "unimportant" features may not be relevant and so this aspect of the thickness measure can be eliminated, such as in the context of a heat transfer topology optimization problem (e.g., designing a heat sink) or in the context of thickness visualization or some other application besides topology optimization.

In any case, using a thinning algorithm to compute a voxelized medial surface of the current 3D model addresses the first and third considerations in that a relatively thin approximation of the medial surface, with no gaps/holes or missing regions, can be computed rapidly. A thinning algorithm works by taking the smooth 3D shape and representing it as a discrete set of voxels of a fixed size. Voxels are successively removed from the surface of the shape according to a set of rules which ensures the topology of the thinned shape matches the topology of the input shape. Note that using the Lee and Kashyap algorithm provides a variation that further culls voxels until only a single-voxel-wide "medial axis" remains. While the medial surface is a 2D manifold embedded in the 3D space (a set of curved surfaces), the medial axis is trimmed until it consists of only curves (a 1D manifold). Like the medial surface, the medial axis retains the topology of the input shape (holes, loops, and beams are all represented), and this functionality of the Lee and Kashyap algorithm can be used in some implementations.

Returning to FIG. 2A, a voxelized line skeleton for the three-dimensional shape is computed 205. This can be done using the Lee and Kashyap algorithm or using another thinning algorithm. In some implementations, the voxelized line skeleton includes one or more line segments that connect different portions of the three-dimensional shape with each other. For example, when there are one or more preserve regions, a voxelized line skeleton can be computed 205 in which the one or more preserve regions are required to be in the result, which means the produced line skeleton will connect with each of the one or more preserve regions. When there are no preserve regions, the computed 205 voxelized line skeleton is the line skeleton that remains after eroding all voxels on any branch that has an end, so as to keep any portions of the topology that connect other portions of the topology with each other, i.e., a loop connects different portions of the topology so it is needed to keep the shape as a cohesive whole, while eliminating regions of the line skeleton that form fingers or other "unimportant" features of the design.

Figure 2D:
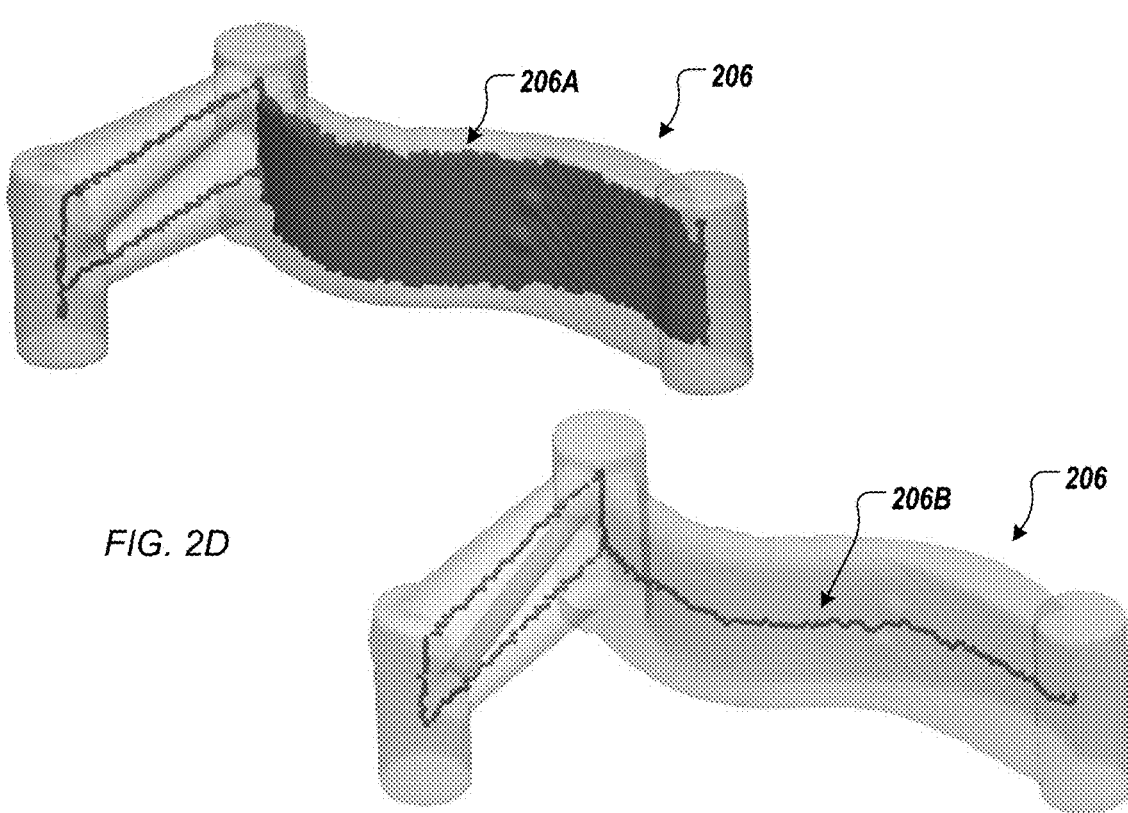
FIGS. 2D and 2E show examples of voxelized sheet and line skeletons.

FIG. 2D shows an example of a voxelized sheet skeleton 206A for a three-dimensional shape 206, and a voxelized line skeleton 206B for the three-dimensional shape 206. Note that when there are one or more preserve regions, these need not be required to be present in the result when computing 200 the voxelized sheet skeleton for the three-dimensional shape. In fact, doing so can cause drift of the sheet skeleton away from the actual medial surface of the three-dimensional shape. Thus, the accuracy of the results of the process can be improved by doing the computing 200 and the computing 205 as explicitly separate operations, rather than combining them into one operation, such as using the Lee and Kashyap algorithm first erode the voxels to a voxelized sheet skeleton and then erode this voxelized sheet skeleton to a voxelized line skeleton.

Also, in some implementations, when 210 there are voxels in the line skeleton that are not in the sheet skeleton, these voxels are kept track of 215 for later use. In any case, outlying voxels are removed 220 from the voxelized sheet skeleton, and then voxels of the voxelized line skeleton are added 225 to the voxelized sheet skeleton to form the voxelized sheet and line skeleton for the three-dimensional shape, for use in measuring local thicknesses of the 3D model. The removing 220 can involve removing voxels that are associated with sheet edges in the voxelized sheet skeleton for the three-dimensional shape. In some implementations, the number of voxels to erode from the sheet skeleton is a tuning parameter, where more erosion increases thickness measures at the edges, thus avoiding undesirable restrictions on shape changes at the edges of thin sheets. The removing 220 can involve removing voxels forming one or more voxelized line skeleton portions of the voxelized sheet skeleton for the three-dimensional shape. Thus, voxels for "fingers" in the current shape can be removed, which encourages elimination of unneeded protrusions from the 3D shape during a topology optimization process.

Figure 2E:
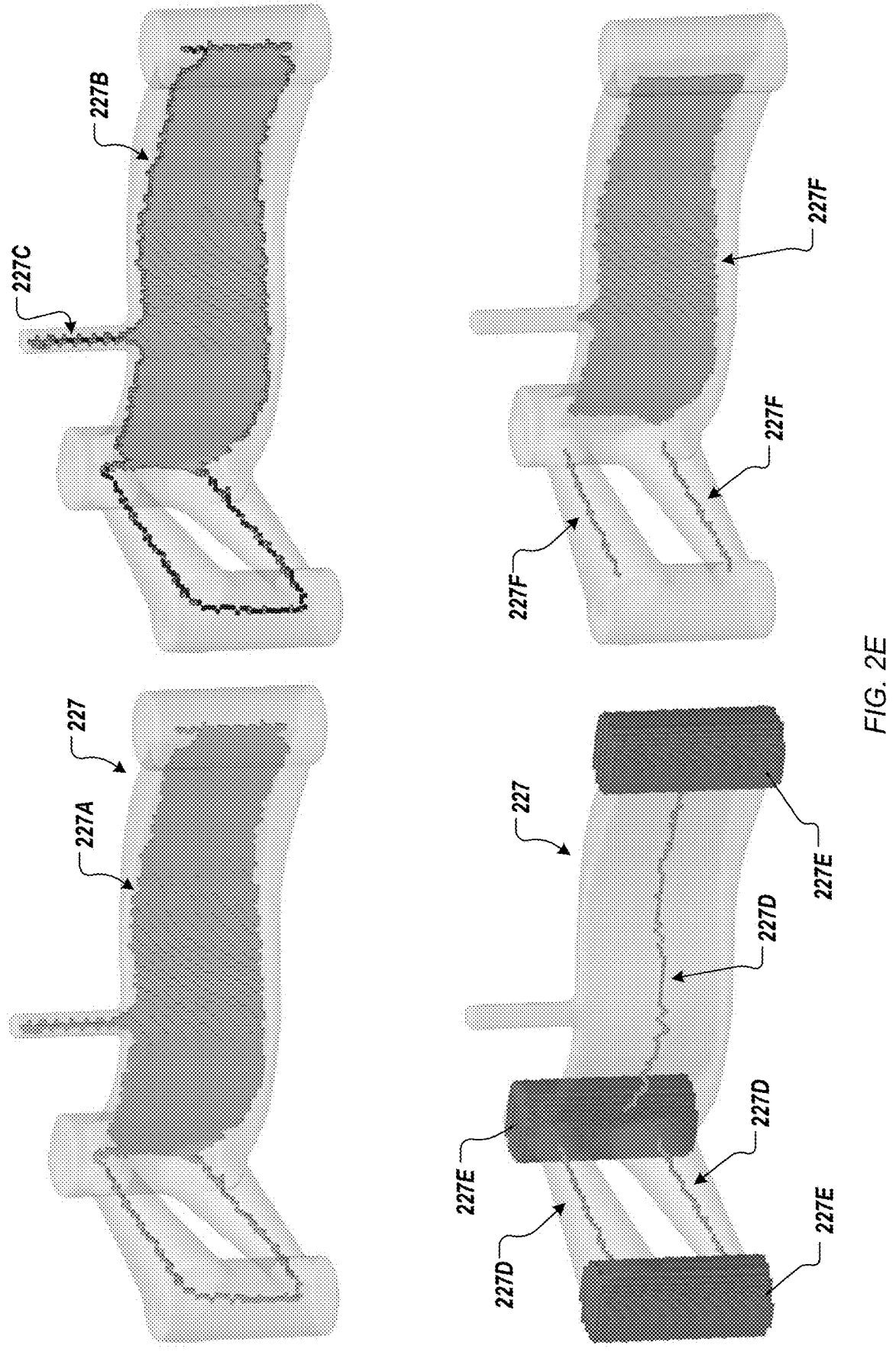

FIG. 2E shows another example of voxelized sheet and line skeletons. An initial voxelized sheet skeleton 227A is computed 200 (e.g., using the Lee and Kashyap algorithm) for a three-dimensional shape 227. Voxels in this sheet skeleton 227A that are associated with the edges 227B of sheets and with degenerate line segments 227C are identified and removed 220. Removing the edges of skeletal sheets implicitly increases the measured thickness of the sheet edges, which is desirable in the context of topology optimization using a minimum thickness requirement since the edges of sheets are not prevented from shrinking even though the interior of the sheets are (but note that in some contexts, e.g., using the thickness measure for visualization applications, the removing 220 is not done since a precise thickness measurement is desired for the entirely of the 3D model). The removal 220 of skeletal sheet edges also reduces noise that is sometimes present around the edges of skeletal sheets. Some segments of line skeleton(s) present in the base sheet skeleton are also caused by noise in the algorithm or protrusions from the part that are not important to the shape's structure, such as the artificial protrusion 227C.

To identify important line skeleton segments, a voxelized line skeleton 227D is computed 205 (e.g., using the Lee and Kashyap algorithm) for the three-dimensional shape 227 with each preserve body 227E required to be present in the result. A final voxelized sheet and line skeleton 227F can thus be produced by subtracting 220 all sheet edges 227B and line skeleton segments 227C identified for the three-dimensional shape 227, adding 225 back the voxelized line skeleton 227D, and finally removing all of the preserves bodies 227E to produce the final voxelized sheet and line skeleton 227F.

Note that in some implementations, the computing 200, 205 of the voxelized sheet and/or line skeletons is only done for regions of the 3D shape that will need to be measured, rather than for the entire 3D shape, in order to reduce the number of computations and thus increase the speed of the process. For example, in the context of applying a minimum thickness constraint, thicknesses need only be measured within a range of thickness values from a maximum value (set in accordance with the minimum thickness value) down to zero. Thus, to speed up the process, the signed distance field (SDF) can be used to isolate one or more regions of interior voxels that are further from the boundary than the maximum value to be measured, and then these region(s) can be ignored for purposes of skeleton computation, refinement, and all subsequent operations, i.e., the medial surface, medial axis, and other computations can be limited to those portions of the 3D model that are of interest due to their not being farther from the boundary of the 3D shape than half the minimum thickness specification, plus an optional buffer amount. In some implementations, a set of "far voxels" (voxels associated with SDF values less than the negative of half the minimum thickness plus a voxel or so) are identified, and this set of far voxels is required to be included in the line and sheet skeleton computations (in the same way the preserve regions are included in the critical line skeleton computation) so that the thinning algorithm does not spend iterations removing them. Then, the far voxels are subtracted from the resulting sheet and critical line skeletons before proceeding to subsequent steps.

In any case, while the use of a thinning algorithm ensures the final voxelized sheet and line skeleton provides one or more connected sets of voxels for all portions (or all relevant portions) of the 3D model outside of any preserve regions, the centers of these voxels are often not exactly on the medial surface of the 3D model. As this can result in different thickness measures on different surfaces that are in fact the same distance from the true medial surface, a refinement process can be employed to generate a final set of points that more closely follow the actual medial surface.

Returning to FIG. 2A, the voxelized sheet and line skeleton is translated 230 into points that better approximate the medial surface of the 3D model. In some implementations, a first set of points that approximate the medial surface of a 3D shape are found 232, and then data values of the first set of points are smoothed 234 by changing location values and/or "radius" values of the points to be an average or a median of data values from its neighbors (immediately adjacent points or all points within a predefined distance of the point) or its neighbors and itself. Other smoothing 234 operations are also possible, such as weighting to select an influence that each neighbor should have on the weighted averaging results. Note that this smoothing 234 of the skeletal points can improve the surface quality of the final 3D shape, yet this smoothing is optional and may not be needed in some applications. For example, noisy data values may not be undesired in the 3D surface(s) being generated for animation production, and could be amplified. Note that the location of a point is in the coordinate system of the design space, and the "radius" of a point corresponds to half the thickness at the location, e.g., the negative of the signed distance field value at that point in the case of a level-set implementation.

In addition, in some implementations, the voxels of the voxelized line skeleton that were not in the voxelized sheet skeleton before the removing 220 were kept track of 215, and these voxels provide a second set of points (e.g., center points of these voxels) for which refinement may not be needed or may not be possible (e.g., no peaks in the signed distance field to be found, as described in detail below). These voxels are needed to keep the shape as a cohesive whole (e.g., to connect the preserve regions) and there are some situations in which these added line skeleton pieces are not actually near the medial surface of the 3D model. Thus, these voxels can be used to provide a measure of thickness that can prevent the optimizer from doing undesirable thinning near a preserve region.

To address the second consideration noted above (that the data points of the approximation should be positioned equidistant from the corresponding boundaries on the shape) the translating 230 of voxels in the skeletal sheet into skeletal point locations can include refining the points indicated by the voxels (e.g., the voxel center points) to be closer to the medial surface of the 3D shape. In level-set based implementations, the skeletal point locations can be refined using information from the level set. In some implementations, this process involves approximating the signed distance field in the neighborhood of the skeletal voxel using linear approximations, and then finding the intersection point between the two line segments. This provides both an estimate of the location and the signed distance field value at a nearby point quite close to the medial surface (experimentally this is typically accurate to about 0.1 voxel widths).

FIG. 2F shows a geometric context for ray casting and extremum estimation to refine a skeletal point to be closer to the medial surface of a 3D shape. Consider the voxelized skeleton 232A of an input shape 231. The algorithm is run once for each skeletal voxel; in this example, highlighted skeletal voxel 1 is addressed. A point that is very close to the true medial axis 2 of the input shape 231 (and as near as possible to the starting voxel) is sought. To do this, a ray can be cast in direction 3, e.g., along the upwind gradient direction, starting at the center of the voxel (or at another point in or near to the voxel, e.g., within one voxel's distance of the voxel) and proceeding toward the medial surface. The intersection point 4 of this ray and the true medial axis is the algorithm's intended output.

FIG. 2G shows a plot of the signed distance value field against distance along a gradient direction. In this plot, the x axis represents distance travelled along the ray and the Y axis is the signed distance field value $\phi$. The starting point of the ray can be the center point of the voxel (voxel 1 in FIG. 2F) and corresponds to point A in FIG. 2G. Two points can be sampled along the negative gradient direction ($B_1$ and $B_2$), and two points can be sampled along the positive direction ($C_1$ and $C_2$). A line can be fit to each pair of points, forming lines B' and C', respectively. So long as the signed distance field is not changing too quickly, the intersection 234A between these two line segments approximates the intersection of the ray with the medial surface (point 4 in FIG. 2F). Note that point A is not on one of the two lines B' and C' because the cast ray shoots off on a diagonal with respect to the voxel grid (not sampling actual voxels) and the data is all interpolated, which means A is not pure data, but rather some linear combination of its neighbors (note that the accuracy of trilinear interpolation is reduced near the medial surface due to the high curvature of the signed distance field, which means interpolated values near the medial surface are typically over-estimated as a result of the sampling points being on opposite sides of the medial surface). Thus, A rarely falls on one of the two lines due to the use of interpolation. The key point is that the linear interpolation allows one to get to a point that is closer to the medial surface than A is, and also to estimate the value of the signed distance field more accurately.

In some implementations, estimating the extremum value can involve searching for a change in the direction or magnitude of the upwind gradient. Note that whether a maximum or minimum value is sought will depend on whether the Y axis for the linear approximations represents the radius value (the negative of the SDF value) or the SDF value. In any case, the estimated signed distance field value $\phi_p$ provides an estimate of the thickness of the 3D model at this point. Note that the sub-voxel location is used when mapping back to the surface of the 3D model because the output points are in 3D space, not in voxel coordinates.

In some embodiments, this refinement procedure is implemented using a 1D Refinement Procedure, which is a function that takes as input the center of a voxel (on the final voxelized skeleton or being a neighbor voxel thereto) from which to start the search procedure, and a direction in which to search, defined as follows:

TABLE 1

Given: Starting point x0 and search direction dir, and a stepback amount b
Find: A point (very nearly) on the medial surface and reasonably close to
x0, an estimate of its distance from the boundary, and a measure of the
quality of the estimate
centerPt, deriv2 = Localize(x0, dir)
if deriv2 <= SECOND_DERIVATIVE_MINIMUM
  fail
peakPt, peakValue, slopeChange = Refine(centerPt, dir, b)
quality = MeasureQuality(deriv2, slopeChange, peakPt, x0)
return peakPt, peakValue, quality The three key functions in this routine are Localize, which tries to find a voxel along the search direction as close as possible to the bottom of the valley of the signed distance field, Refine, which uses linear approximation to estimate the coordinate and distance from the boundary of the crossing of the medial surface, and MeasureQuality, which creates a quality measure for this medial surface intersection useful in subsequent steps as described later.

The Localize function can be used to address the fact that sometimes, point A in FIG. 2G is not close enough to the medial surface for the points $B_1$ & $B_2$ and $C_1$ & $C_2$ to fall on opposite sides of the medial surface crossing. For example, if point $C_1$ falls on the same side of the medial surface as both points $B_1$ and $B_2$, then the linear approximation C' will not intersect the medial surface, and the intersection of the two linear approximations B' and C' will not be close enough to the actual medial surface of the 3D shape (e.g., more than half a voxel away from the medial surface). This can occur in some cases as a result of discretization errors in creating the binary shape and slight irregularities in the rate of material removal in the thinning algorithm.

To address this issue, a first localization operation can be used to move from the input location along the search direction (forward or backwards) and seek to identify a voxel as near as possible to the medial axis crossing. Note that it is only required to identify one of the voxels adjacent to the medial axis crossing, i.e., identify either of the points A or $C_1$; the voxel that is the closest to the medial surface is not needed. Thus, in some implementations, the following Localize procedure is used:

TABLE 2

```
Given: Starting point x0 and search direction dir
Find: A voxel center near the medial axis traveling along +/−dir starting
at x0, and an estimate of the second derivative of the level set field at
that point
MAX_TRAVEL = 4 voxels
plusVal = Sample(x0 + dir)
minusVal = Sample(x0 − dir)
moveDir = 1
if minusVal < plusVal then
    moveDir = −1
samples = empty list of (s, value)
for p = −1 voxel; p < MAX_TRAVEL + 1 voxels; p += 1 voxel
    s = p * moveDir
    samples += {s, Sample(x0 + s * dir)}
bestDeriv2 = 0
bestS = 0
for j = 1; j < len(samples) − 1; j += 1
    deriv2 = (samples[j−1].value + samples[j+1].value − 2 *
        samples[j].value) / (voxelSize * voxelSize)
    if deriv2 > bestDeriv2 then
        bestDeriv2 = deriv2
        bestS = samples[j].s
return {x0 + dir * bestS, bestDeriv2}
```

The Localize procedure of Table 2 consists of three parts. First, the signed distance field is sampled on either side of the start point to determine which direction leads further from the shape boundary, which corresponds to a more negative signed distance field. Next, a series of samples of the signed distance field (SDF) are collected at one voxel increments along the movement direction, starting with a backwards step of one voxel in the opposite direction, and the results are stored in a list of pairs of {s value, SDF value}. Finally, the second derivative is computed, e.g., using a first order centered finite difference, and the largest second derivative value and its corresponding sample point are returned (recall that the SDF value is transitioning from a negative slope to a positive slope, so the second derivative should be large and positive near the crossing).

FIGS. 2H and 2I show this process of finding a voxel along the search direction that is as close as possible to the bottom of the valley of the signed distance field. FIG. 2H shows samples S on the signed distance field along the search direction, parameterized by s. In the first step, given a starting point (s=0) the process samples on either side to compute $\phi^-$ and $\phi^+$ (minusVal and plusVal, respectively, in the code). Finding that $\phi^+$ is further from the shape boundary, a positive move direction is chosen. Next, a series of samples of the signed distance field are collected along the direction dir by varying s in even voxel increments (these are $S_j$ in the figure and stored as samples in the code). Note that the first sample is taken one voxel in the negative move direction (i.e., at s=−1).

FIG. 2I shows the values of the approximate second derivative, parameterized by the sample index j. As shown, the computed second derivatives at each point in the vector samples are plotted. Note that end points of the vector are omitted since a neighbor is needed on each side to compute a centered finite difference. The largest second derivative corresponds to sample at j=3, and this second derivative value is returned from the function along with the coordinate of the corresponding point. Note that in some cases, if after localization the second derivative value is smaller than a fixed cutoff value (e.g., 0.25), then the search can be abandoned. This is typically caused by the search direction being significantly different than the gradient.

After the Localize procedure, the Refine procedure can be provided with a starting point that is located on a voxel very near to the actual medial surface intersection. From Table 1, note that the starting point argument to the Refinefunction is the output of the Localizefunction ($x_1$) and not the center of the starting voxel ($x_0$). Search still happens along the direction dir (d), but from a different starting point. To remind ourselves of the change of coordinates, we will switch the independent variable from s to t below (both variables represent a movement of some distance along the direction vector, but from different starting points; the two are related by $t=s-(x_1-x_0) \cdot d$). In addition to $x_1$ and d, the Refine function also takes an argument titled the "stepback distance" and denoted as b.

Line B' is constructed from two sampled points $B_1$ and $B_2$ to the left of the starting voxel (A), which corresponds to the voxel x_1 in Table 1, and line C' is constructed from two sampled points $C_1$ and $C_2$. Each pair of points is separated by the distance of a voxel size, and the first point in each set is separated from the center point A by the stepback distance b. As a result, the location of each point in t is, $$t_{B1} = -b \tag{4}$$

$$t_{B2} = -b-1$$

$$t_{C1} = b$$

$$t_{C2} = b+1$$

The b parameter is motivated by the case where d is not aligned with the voxel grid. In this case, every sample into the signed distance field uses trilinear interpolation, which introduces a blurring of the field values. Near the medial surface, this blurring causes a one-voxel rounding of the trough in the distance function. By choosing b>voxel, we can more accurately estimate the behavior of the underlying signed distance field without seeing errors from this blurring effect. For example, b can be set to 1.5 voxels when d is not axis-aligned.

Let $m_B$ and $m_C$ denote the slopes of the lines B' and C', respectively. We first check that the two linear approximations are not parallel by ensuring that the absolute difference between $m_B$ and $m_C$ is greater than a threshold (e.g., 0.01). If the lines are determined to be (nearly) parallel, the search fails. We compute the intersection point between these two lines. The t coordinate of the intersection is given by $$t_p = \frac{m_B t_{B1} - m_C t_{C1} + \phi_{C1} - \phi_{B1}}{m_B - m_C} \tag{5}$$

in which $t_{B1}$ and $\phi_{B1}$ represent the t coordinate and signed distance field value at the point $B_1$. If the search succeeded, this intersection should occur within one voxel length of t=0. But if the linear approximations do not reflect a reasonable shape for the signed distance field in this region, this can be detected and the search can be aborted. The value of the signed distance field at the intersection is found readily by $$\phi_p = \phi_{B1} + m_B(t_p - t_{B1}) \tag{6}$$

and likewise the 3D coordinate of the intersection is found as $$X_p = x_1 + t_p d \tag{7}$$

using the search starting point $x_1$ and search direction d

A final output of the Refine routine is a measure of the change in slope between the two lines. This is computed as $$\Delta m = \left| \frac{m_B - m_C}{1 + m_B m_C} \right|. \qquad (8)$$

In addition, in some implementations, a further refinement to this algorithm involves adjusting the locations of the points used to create the two fit lines to produce better results in regions of high curvature. In regions of high curvature, approximating each line B' and C' using neighboring samples ($B_1$ and $B_2$ for example) may introduce errors because the signed distance field is not well approximated by a piecewise linear formulation. In such cases, a better approximation of the line can be obtained using less data far from the medial surface crossing, e.g., by using point A in place of point $B_2$ to form the line B'. This can be done by generating more than one line approximation on each side of the medial surface, and using the line approximation with the steeper slope.

Once the Localize and Refine routines are complete, a quality can be assigned to the medial axis point found from the search. The quality is a heuristic that tries to balance the degree to which the search direction was perpendicular to the medial surface (more perpendicular searches result in more accurate estimates of the medial surface location because of greater slope change) and the distance travelled between the starting point $x_0$ and the refined medial surface approximation $x_p$. This quality measure can be computed as, $$q = \phi'' + \tan^{-1}(\Delta m) - 2q_0 |x_p - x_0| \qquad (9)$$

where $\phi''$ is the second derivative measure from the Localize function and $q_0$ is a constant (e.g., 0.2 divided by the voxel size).

The result of the LocalizeAndRefine routine is an estimate of the location close to the medial axis when searching along the specified search direction starting from the specified search point. The routine also returns a quality measure describing how "good" this medial point is for use in downstream computations. The search routine can fail midway if any of the following requirements are not met: (1) the largest second derivative must be greater than a specified minimum (e.g., 0.25); (2) the absolute difference in slopes between the two fit lines ($m_B$ and $m_C$) must be greater than a threshold (e.g., 0.01); and (3) the location of the medial axis point ($t_p$) found in the Refine step must be within a specified distance of the center point (t=0) (one voxel). When a failure of the search routing occurs, the function returns an invalid result, and another search direction can be used for this skeletal voxel. This can be repeated until a valid result is returned.

The 3D refinement procedure can execute one or more 1D refinement procedures for a given starting skeletal voxel and select one to return as the closest & best medial surface point. The 3D refinement procedure is described in the pseudocode in Table 3.

TABLE 3

```
Given: Starting point x0, and a flag gradSearch indicating whether
gradient search should be used
Find: A point (very nearly) on the medial surface and reasonably close to
x0 and an estimate of its distance from the boundary
candidates = empty list
if gradSearch then
    gradient, x0new = UpwindGradient(x0)
    candidates.insert(LocalizeAndRefine(x0new, gradient, 1.5))
```

TABLE 3-continued

```
if len(candidates) == 0 or candidates[0] invalid:
    candidates.insert(LocalizeAndRefine(x0, x_direction, 1.0))
    candidates.insert(LocalizeAndRefine(x0, y_direction, 1.0))
    candidates.insert(LocalizeAndRefine(x0, z_direction, 1.0))
best = select valid candidate with largest quality, or x0 if all are invalid
return best.point, best.value
```

In this routine, the function UpwindGradient returns an estimate of the upwind gradient, and possibly updates the starting point for the search (this is discussed further below). A candidate is invalid if the search routine failed for any of the reasons identified in the previous section. In the second to last line, a search routine examines the list of candidate results and locates the one which has the largest measure of quality, unless all searches failed (in which case the result is the original point).

Note that the refinement 230 of the points indicated by the voxels to be closer to the medial surface need not be limited to a one-to-one mapping of initial points to refined points, as described above. Thus, the refining 230 of each initial point can produce two or more points that are on (or very near) the medial surface, and these additional points can then be used for thickness computations. For example, the search routine in the second to last line of the pseudocode in Table 3 can return all viable refined point coordinates. Moreover, the 3D refinement routine need not be called for every skeletal voxel, and the gradSearch parameter can depend on the kind of skeletal voxel being analyzed.

In some implementations, skeletal voxels are classified and refinement can be handled differently for different classes of skeletal voxel. As noted above, the final voxelized sheet and line skeleton includes the trimmed 220 sheet skeleton combined 225 with the computed 205 line skeleton. By examining the origin of the voxels, each skeletal voxel can be classified into one of three categories: (1) sheet skeleton voxels are those voxels belonging to the trimmed sheet skeleton; (2) line voxels are those voxels belonging to the line skeleton and the sheet skeleton before trimming, but not contained in the sheet skeleton after trimming; and (3) non-medial-surface voxels are those voxels belonging to the line skeleton, but not the sheet skeleton before trimming.

Identifying non-medial-surface voxels is important because they represent voxels included in the skeleton to ensure the connectivity of the shape is retained, e.g., the connections between the preserve regions, even if there is little or no medial surface that actually touches a preserve region. In these regions, it does not make sense to attempt to refine 230 the skeleton. Voxels which do not lie near the medial surface should not be refined. Running the refinement algorithm in these cases will either fail, or pick up some other nearby region of medial surface and distort the intent of the algorithm.

Sheet skeleton voxels can use the 3D refinement algorithm with the gradSearch parameter set to false. In these regions, while searching in the gradient direction might produce a slightly higher quality intersection with the medial surface, searching along a set number of different predefined directions (e.g., at least three orthogonal directions, such as the cardinal (x, y, z) directions) and then selecting intersection points based on quality, will produce an approximation that is good enough, and carries the advantage that most (if not all) skeletal voxels in sheet regions of the 3D model will use the same search direction as their adjacent skeletal voxels for generating the refined (intersection) points. This uniformity of search direction reduces the point-point noise in the location of the refined skeletal points and helps the refined skeletal points remain more uniformly distributed across the medial sheet. When run with gradSearch set to true, e.g., for line voxels, the 3D refinement procedure will use the gradient search direction and only falls back on searching in the set number of different predefined directions if the gradient search fails. This avoids cases where a search in one of the predefined directions (e.g., the cardinal directions) might return a result with higher quality and supplant the (preferred) gradient search result.

Figure 3A:
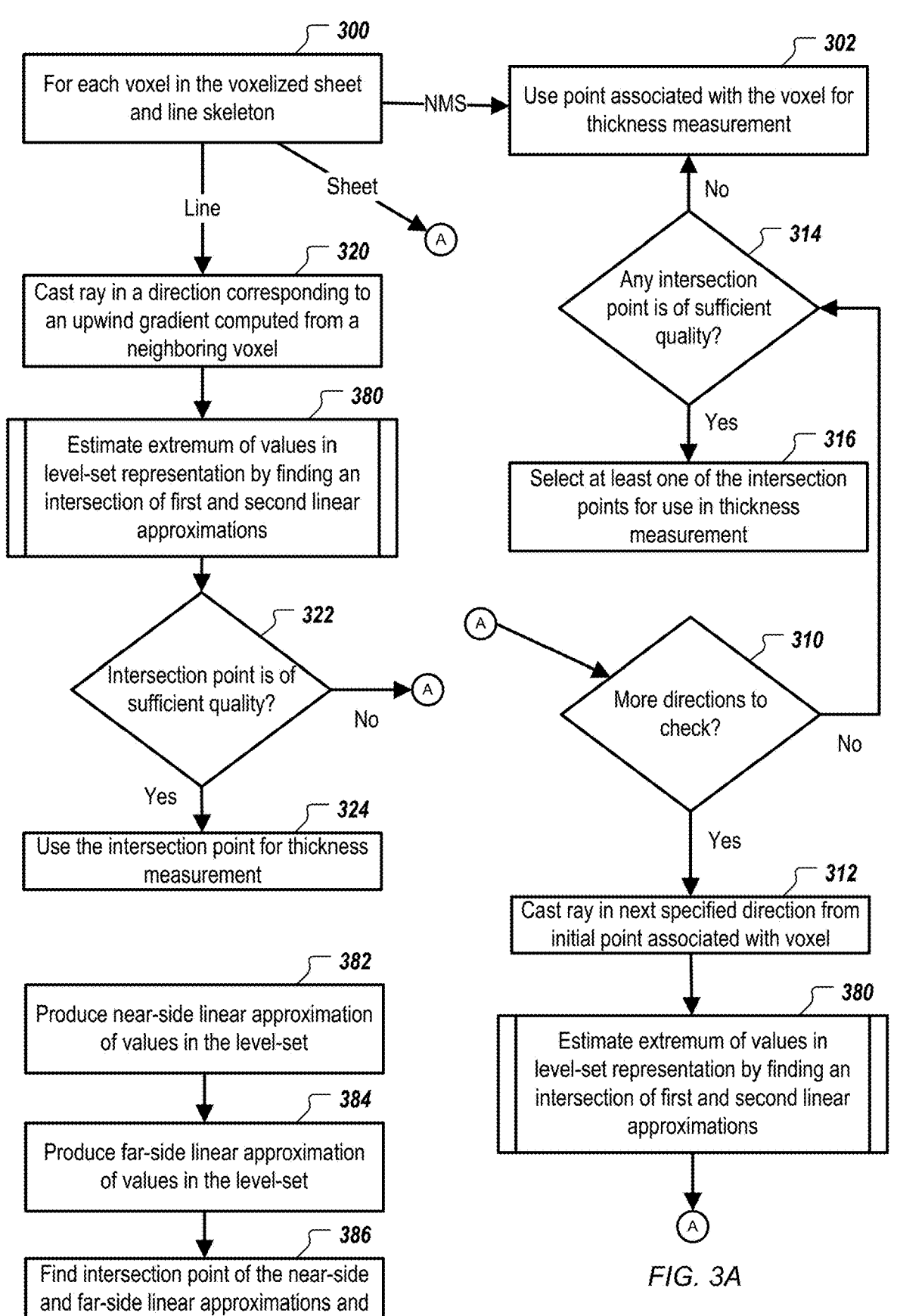
FIG. 3A shows an example of a process that performs selective refinement of points obtained from voxels in a voxelized sheet and line skeleton of a 3D model.

FIG. 3A shows an example of a process that performs selective refinement of points obtained from voxels in a voxelized sheet and line skeleton of a 3D model. The process of FIG. 3A is an example of translating 230 a voxelized sheet and line skeleton into points that approximate a medial surface of the 3D model. The process of FIG. 3A is performed for each voxel 300 in the voxelized sheet and line skeleton, but the process varies depending on whether the voxel is a sheet skeleton voxel (belonging to the trimmed sheet skeleton), a line voxel (belonging to the sheet (plus line) skeleton before trimming but not contained in the sheet skeleton after trimming), or a non-medial-surface (NMS) voxel (belonging to the line skeleton but not the sheet skeleton before trimming).

For each NMS voxel, a point in that voxel (e.g., the center point of the voxel) is used 302 as the point at which to measure local thickness (e.g., because no location refinement for the points generated from such voxels may be possible). For Sheet points, a multi-directional search is performed. For each Sheet voxel, each of the predefined directions (e.g., at least three orthogonal directions, such as the cardinal (x, y, z) directions) are checked 310 to see which (if any) is best. A ray is cast 312 in the next direction from an initial point associated with the voxel. In some implementations, the initial point is determined using the Localize procedure described above. Then, an extremum of values in the level-set representation is estimated 380 by finding an intersection of first and second linear approximations generated using this cast ray. In some implementations, the estimating 380 is performed using the Refine procedure described above.

The estimation 380 process can involve producing 382 a near-side linear approximation of values in the level-set representation (i.e., on a side of the medial surface that is nearer to the initial point that the medial surface), producing 384 a far-side linear approximation of values in the level-set representation (i.e., on an opposite side of the medial surface from that of the initial point), and finding 386 an intersection point of the near-side linear approximation with the far-side linear approximation, plus a quality value for the intersection point. For example, the producing 382, 384 and finding 386 can be performed as described above, where the quality value is based on perpendicularity of the cast ray with respect to the medial surface and a distance between the initial point and the intersection point. See for example, the pseudocode in Table 3 and corresponding description, and Equation 9. Note that using the directional second derivative and the change in slope between the two fit lines as proxies for the orthogonality between the medial surface and the cast ray is but one possible measure of quality.

In general, a quality measure starts with the likelihood that the candidate point is quite close to the medial surface to be located (i.e., the error is low). Since the actual medial surface location is not known, the algorithm can take into consideration one or more conditions that would result in a low confidence for the result. A first aspect of quality can be driven by the assumption inherent in the linear approxima-tion of the signed distance field, which is that the signed distance field behaves linearly. This assumption is invalid if the medial surface is curved and the ray is cast along a direction other than the gradient, but if the ray is cast along (or nearly along) the gradient of the signed distance field, the linear approximation is reasonable. However, casting along the gradient at the starting point isn't perfect, because the gradient on the other side of the medial surface crossing will (in general) have a different direction, so a ray cast along the local gradient direction may be mis-aligned with the gradient on the far side of the medial surface crossing. Thus, the best case scenario is to cast the ray perpendicular to the medial surface, which results in a small directional difference with respect to the gradient on both sides of the medial surface crossing.

A second aspect of quality arises because the mathemati-cal precision of the line-line intersection improves as the change in slope between the two lines increases. Equation 5 will have lower error for the value of $t_p$ for a given uncer-tainty in the accuracy of the data points $\phi_i$ (which are used both directly and indirectly through the slope terms) if the denominator remains relatively large. As the denominator shrinks, the value of $t_p$ becomes more sensitive to small errors in the signed distance field.

Both of these quality considerations suggest that a ray cast perpendicular to the medial surface will give the lowest error estimate. Since the actual orientation of the medial surface is not known, one or more proxy measures can be used to estimate the orthogonality of the ray and the medial surface. These can include (1) the degree of slope change, as measured by comparing the slopes between the two lines since it is known that when the ray crosses the medial surface obliquely the slope change is minimal, and a cross-ing perpendicular to the medial surface has a correspond-ingly larger change in slope, and (2) the estimated second derivative of the signed distance field over the medial surface crossing, as measured in the Localize function. Again, the larger the second derivative, the more likely it is that the cast ray has encountered the medial surface "head on". Other measures are possible. For example, the symme-try of the slopes of the fit lines can be examined, i.e., are the two fit lines roughly symmetric, one having approximately negative the slope of the other. As another example, the upwind gradients can be sampled on both sides and be compared with the search direction to come up with a measure on the orthogonality of the medial surface crossing.

A third aspect to quality stems not from the accuracy of the prediction, but the uniformity of the spread of points approximating the medial surface. It is desirable to have a uniform distribution of refined points, but if the search is allowed to extend too far along any particular search direc-tion, another branch of the medial surface, which has a larger slope change, may be picked up. To address this issue, a measure of the distance travelled between the starting point and the line intersection can be included as a component of the quality measure. Thus, weaker slope changes that are closer to the starting point are favored in order to avoid large gaps in the refined approximation of the medial surface.

Various quality values can be constructed using one or more of these quality measures: second derivative, slope change, and distance from the starting point. The differences among these various quality values can depend on how much importance is to be given to each quality measure. In some implementations, a weighted sum of the second derivative, the angle between the two lines (which can be found as the arctangent of $\Delta m$) and the distance travelled is used, e.g., as detailed in Equation 9. Many other quality functions can be used to estimate the quality of the intersection point in various implementations.

The multi-directional search is performed until all directions have been handled 310, and then a check 314 is made to determine if any of the intersection points found in the different ray casting direction is of sufficient quality. If so, at least one of the intersection points is selected 316 for use as one or more refined points for the sheet skeleton. If not, a point in the voxel itself (e.g., the center point of the voxel) or the initial point associated with the voxel is used 302 as the point to use to measure local thickness. Note that the sufficient quality check can be implemented as implicit checks on each of the quality measures described above, such as by using the checks embedded in the localization and refinement functions. If any of these checks fail, the search is terminated as unsuccessful. For example, the search distance can be limited by the Localize function's maximum of (e.g., 4) voxels traversal, the second derivative value can be checked after the Localize function and the search terminates if it is not large enough (e.g., min 0.25), and the Refine function terminates if the two slopes are too close together (e.g., $\Delta m < 0.01$). Note that different lower limits on the computed quality of the individual component can be used in different implementations, such as in the case where more than one medial surface approximation is to be kept per input voxel. Setting the threshold in a particular implementation is a matter of running some experiments and tuning the results to achieve the desired balance of accuracy and coverage of the medial surface.

This process of using the predefined directions (e.g., the cardinal (x, y, z) directions) carries the advantage that adjacent skeletal sheet voxels will mostly use the same search direction and so have their points refined (toward the medial surface) in the same direction, thus reducing noise in the refined points used for thickness measurement. In contrast, when near the line skeleton, a search along the x, y, and z directions may produce choppy or aliased thickness measurement because the skeletal point locations switch between refinement directions depending on which gives a better quality. For line skeleton regions in the 3D model, the medial surface may in fact be a linear medial axis, which is harder to hit, and so searching in the cardinal (X, Y, Z) directions may miss the medial axis all together, in addition to potentially introducing noise in the region of the line skeleton.

Thus, for Line points, a gradient-first search is performed, which starts by casting a ray in an upwind direction, and then falls back to the multi-directional search if the upwind direction does not produce a useable result. For each Line voxel, a ray is cast 320 from the initial point in a direction corresponding to the upwind gradient computed from the voxel or its neighboring voxel. Then, an extremum of values in the level-set representation is estimated 380 by finding an intersection of first and second linear approximations generated (as described above) using this upwind-gradient-based cast ray. Then a check 322 is made to determine if the found intersection point is of sufficient quality (e.g., using the same criteria described above). If so, the intersection point is used 324 as one of the refined points for the sheet skeleton. If not, the process falls back to the multi-directional search for this line voxel.

FIG. 3B shows how to define and compute upwind gradient in a level-set representation of a 3D model, as can be used in the UpwindGradient function in Table 3. An upwind gradient (as used here) seeks the gradient in the direction away from the medial surface (i.e., towards the exterior of the shape). We need a measure of the gradient that describes the direction of greatest level set value increase. Away from the medial surface, a centered finite difference works well, but near the medial surface, if the stencil for the finite difference straddles the medial surface, the direction and magnitude of the gradient computed may be incorrect. Thus, a central finite difference estimate 340 of the gradient away from the medial axis provides a result that is aligned with the actual gradient field, but a central finite difference estimate 342 of the gradient near the medial axis provides a result that does not correspond with either of the actual gradient fields on the two sides of the medial axis.

In FIG. 3B, the voxels are represented by boxes, the signed distance field values are the numbers in the boxes, the dotted boxes are those used in the stencil of the gradient computation for the shaded voxel, and each thick arrow represents the direction of the computed gradient. The thick line is the boundary of the shape, and the medial axis and actual gradient field are as annotated in FIG. 3B.

In 1D, the classical upwind finite difference computation 344 uses either the forward 346 or backwards 348 finite difference formulation depending on which neighbor has the larger signed distance field value (further from the medial surface) thus providing the upwind finite difference 350. In 2D, this logic is applied for each axis of the stencil. For example, use whichever neighbor in the x direction has the larger signed distance value, and whichever neighbor in the y direction has the largest signed distance value, and likewise for z. But this classical finite difference still struggles in cases where the effective stencil (the set of neighbors used to compute the finite difference) straddles the medial surface, as shown in the classical upwind finite difference approximation 352 of the gradient straddling the medial surface (note the reduced stencil caused by the selection of the neighbors with larger signed distance field value). This is a fundamental weakness of the (otherwise simple and elegant) upwind gradient calculation. If the incorrect gradient direction is used, the search will look along a line tangent to the medial surface, which can cause problems for the search procedure and the distribution of points in the resulting skeleton.

To avoid this risk, the starting point of the search can be moved to a neighboring voxel that is further from the medial axis. At this new starting point, the upwind gradient can be computed in the usual manner and an accurate result is obtained. The localization step in the 1D refinement algorithm can still readily find the medial surface crossing, even if it is one voxel further away. Thus, in some implementations, the neighboring voxel with the lowest value of the discrete Laplacian (which measures magnitude of the second derivative, or which measures net change of the gradient) is found 354 and is then used 356 as the revised starting point for the search procedure.

Note that this approach may not work well for medial sheets, because more than one skeletal voxel may have the same nearest neighbor with the lowest Laplacian value. If this happens, then "clumping" of the resulting medial surface points occurs, reducing the uniformity or even introducing significant gaps in the medial surface measurement. Thus, in some implementations, the upwind gradient search direction is only used when in regions of line skeleton. Nonetheless, the signed distance field around medial axes typically has at least one principle curvature convex, which significantly increases the likelihood that each skeletal voxel will find a unique lowest Laplacian neighbor.

Figure 2J:
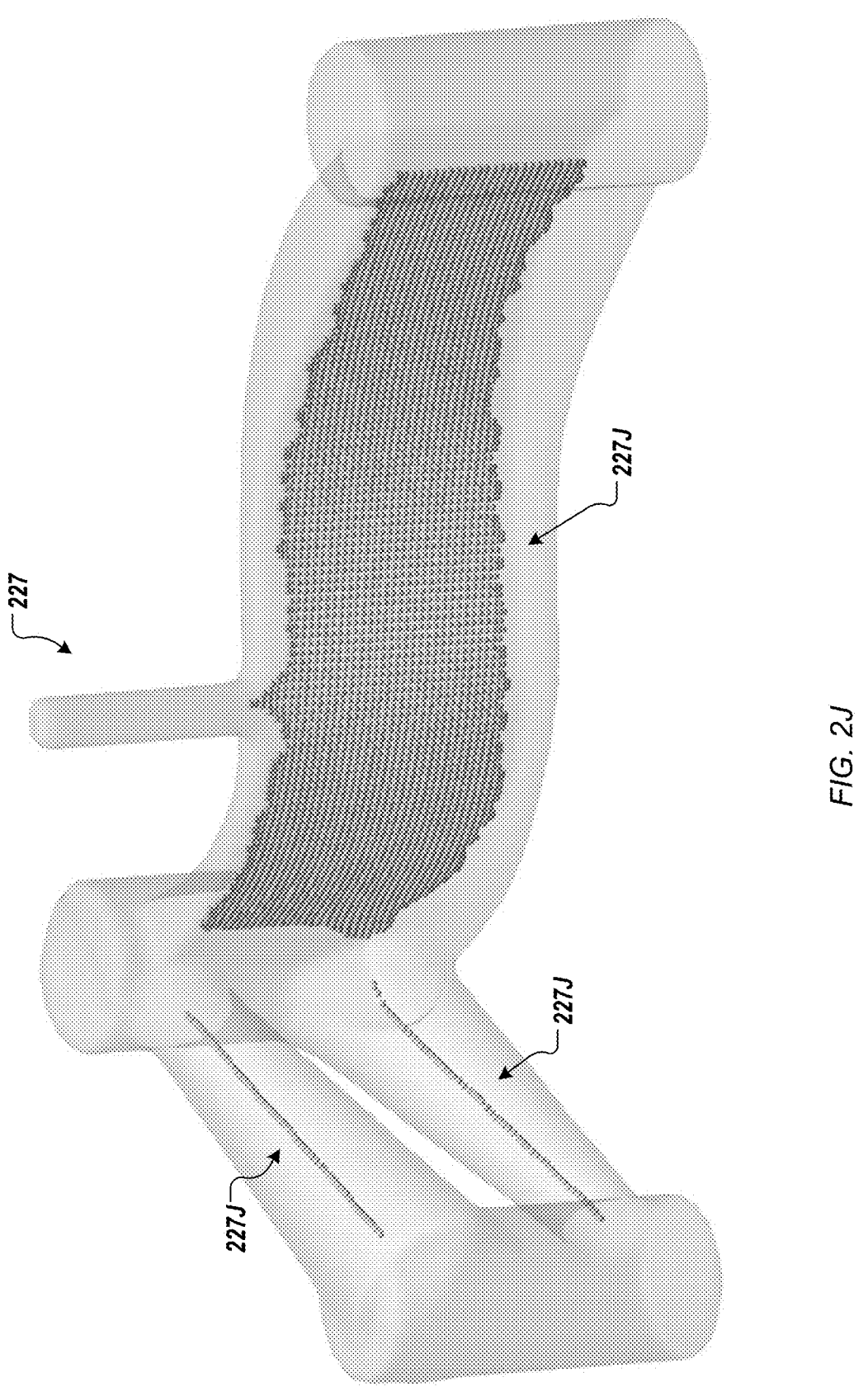
FIG. 2J shows a final point skeleton for the three-dimensional shape of FIG. 2E.

In addition, as noted above, to reduce noise, after the skeletal refinement is complete, the points skeleton can be smoothed, e.g., by repeatedly averaging each skeletal point's location (and optionally radius) with that of (a) its neighbors (immediately adjacent points or all points within a pre-defined distance of the point) or (b) its neighbors and itself; this can reduce or eliminate any error remaining in the estimates of the medial surface. FIG. 2J shows a final point skeleton 227J (after trimming, augmentation, refinement, and smoothing operations have been performed) for the three-dimensional shape 227 of FIG. 2E. Returning to FIG. 2A, thickness values are generated 240 using the points skeleton (i.e., using at least the points that approximate the medial surface of the 3D model). In some implementations, the generating 240 involves searching for the skeletal point that is closest to the surface point for which a thickness is needed, and then using the radius (or twice the radius) of that skeletal point as the thickness at the surface point, or calculating a distance (or twice the distance) between the surface point and the closest skeletal point.

Thus, the generating 240 can include calculating 242 distances between surface locations on the 3D model and the first set of refined medial surface points and calculating 244 distances between surface locations and the second set of points for the tracked 215 voxels (e.g., the center points of the voxels of the voxelized line skeleton that were not in the voxelized sheet skeleton before the removing 220). Note that the calculating 242, 244 need not be separate operations, and can be lumped into a single operation using the union of NMS, Line and Sheet skeleton points. In some implementations, the radius values for the points are used, and the generating 240 then involves finding the nearest skeletal point to each surface location, e.g., using KD trees or octrees to accelerate the search, and using the radius value (or twice the radius value) of that point as the measured thickness at the surface location. Note that search acceleration (e.g., using KD trees or octrees) can be used regardless of whether the thickness is defined based on the distance between the skeletal point and the surface or on the negative signed distance field value of the skeletal point.

In level-set implementations, the generating 240 can involve calculating the thickness values at the surface of the 3D model using a "corrected" level-set representation. The point skeleton (e.g., point skeleton 227J) is a high-quality approximation of the important parts of the medial surface of the 3D model, and optionally of other important parts of the 3D model, such as portions that connect with one or more preserve regions. Each of these points has an associated thickness based on the SDF of the level-set representation (e.g., the point "radius" values). While these thickness values can be used as is, e.g., for computing statistics for the 3D model, a measure of thicknesses at the surface of the 3D model is used to enforce a thickness constraint during shape (and optionally topology) optimization.

Figure 2K:
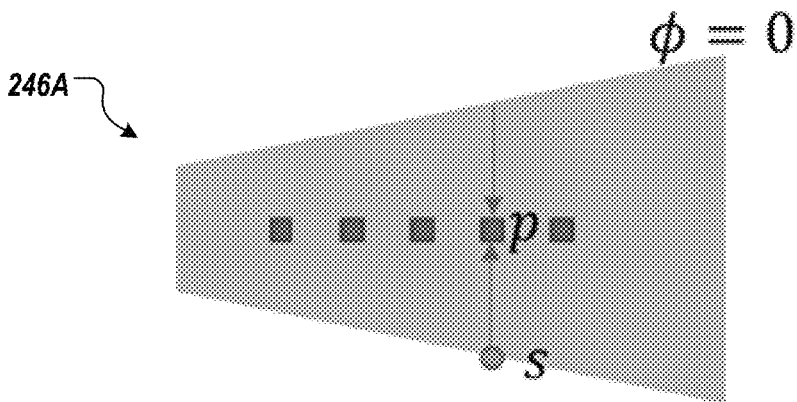
FIG. 2K shows an example of generating thickness values at the surface of a 3D model using a thickened level-set representation of the 3D model.
Figure 2K:
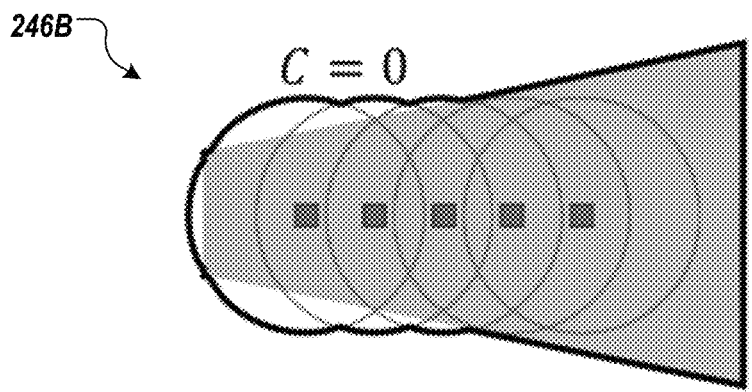
Figure 2K:
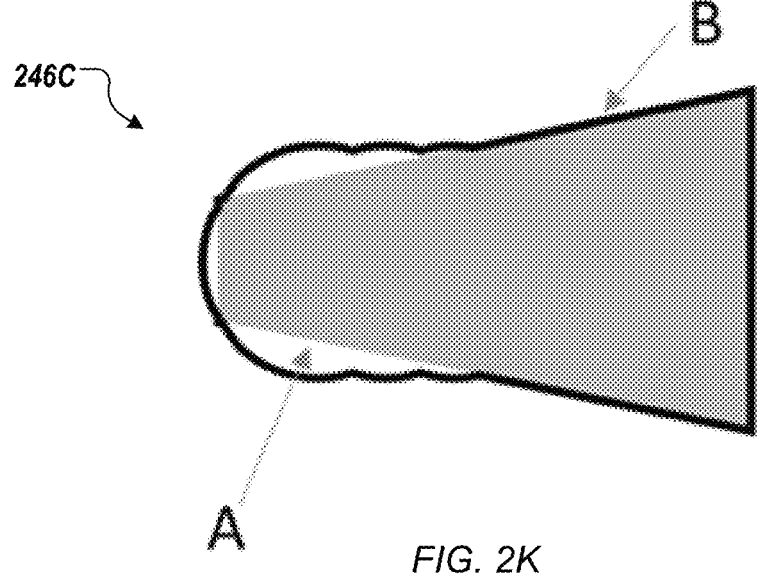

FIG. 2K shows an example of generating thickness values at the surface of a 3D model 246A (represented as a simple 2D trapezoid for clarity in presentation) using a thickened level-set representation of the 3D model 246A. The thickness value at a surface points can be defined to be $2|p-S|$, where p is the nearest point in the final point skeleton. But rather than do a search to find point p, a corrected level-set representation is used, which can improve the robustness and reduce the processing time for the thickness calculations. A copy of the input 3D model 246A is made, and for each point in the final skeleton, a Boolean union of a sphere (centered on the point) is performed on the copy to form the thickened level-set representation 246B, where the diameter of these spheres can be set equal to the largest thickness to be measured, e.g., $t_{min}+\varsigma+\Delta$. The thickness is then computed 246C using the difference between the input level-set field $\phi$ and the corrected level-set field C. Note that at point A, the thickness can be estimated as $t_A=2(r_{max}-(\phi(A)-C(A)))$, where $r_{max}$ is half the maximum thickness to be measured. At point B, the two level sets are the same, so the thickness at this point must be greater than or equal to $2r_{max}$.

Figure 2L:
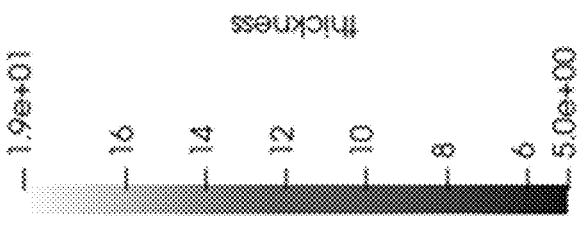
FIG. 2L shows an example of level-set difference measured thicknesses at the surface of the three-dimensional shape of FIG. 2E.
Figure 2L:
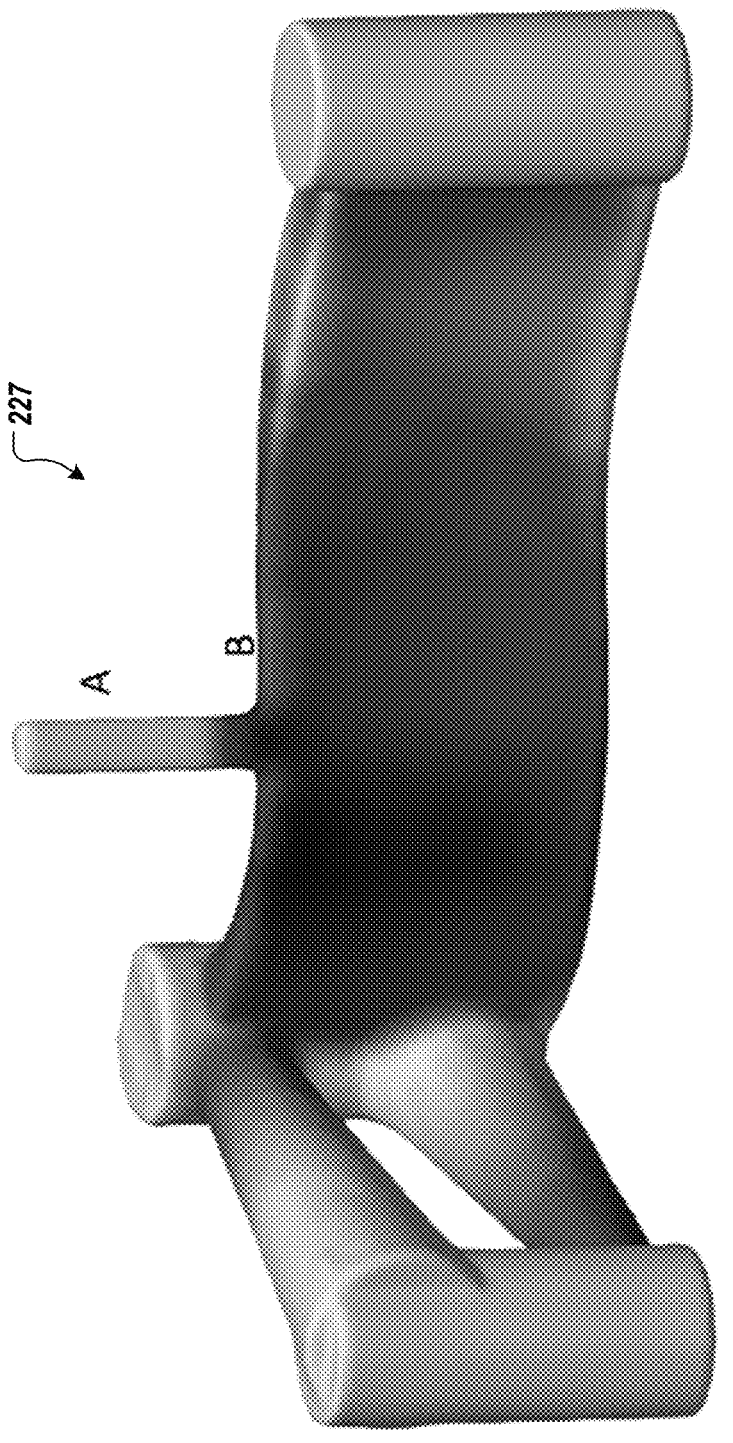

Note that different formulations of this thickness measure are possible, e.g., using the maximum thickness to be measured rather than $r_{max}$. In any case, the difference between the level-set representations is computed to determine the degree to which the input level-set representation is locally thinner than the thickened level-set representation. FIG. 2L shows an example of level-set difference measured thicknesses at the surface of the three-dimensional shape 227. Note the artificially thick values assigned to the protrusion at location A, which was removed in trimming, as well as the relatively larger thicknesses assigned to the edges & corners of the central sheet, such as at location B.

Nonetheless, while one or more aspects of the voxelized thinning based distance to medial surface process described above can be used in various implementations, other thickness measuring techniques can be used instead, either for shape optimization or for shape and topology optimization of a 3D model, as noted in connection with FIG. 1C. In general, the thickness constraint techniques that are described below (referred to as the ramped scaling process for applying a thickness constraint, which can be implemented in the 3D model update 185C) can use any of various techniques for measuring the thickness at the surface of the 3D shape, including prior art thickness measurement techniques that have been used in different constraint formulations in the past. Thus, while there are advantages of using the voxelized thinning based distance to medial surface process in combination with the ramped scaling process for applying a thickness constraint, many different types of thickness measurements can be used with the ramped scaling process. And, as noted elsewhere in this document, the converse is also true: the voxelized thinning based thickness measure can be used with other constraint formulations.

For example, variations of the process of approximating the medial surface can be employed. The Laplace operator can be used to find regions of high curvature in the level-set field, which correspond to points near the skeleton. These can be used instead of points selected by the thinning algorithm. Voronoi diagrams can be used to extract medial sheets from 3D solids. Heuristic schemes that fit spheres into the interior to find points of the skeleton can be used. Moreover, such approaches can be combined with one or more of the refinement, augmentation and mapping algorithms presented above, or be used on their own to create a surface measurement method.

The trimming and augmentation algorithm presented above can be replaced with an alternative approach. For example, a path finding algorithm can be used to connect the preserve regions, rather than eroding to a voxelized line skeleton. Edges of the sheet skeleton to remove can be selected using another approach, such as examining the voxel neighborhood, casting rays along the upwind gradient direction, or measuring the difference between the two nearest upwind gradient directions for points near the medial surface. Another approach to refining the point skeleton can be used, such as using a ray casting approach (e.g., looking for changes in the direction or magnitude of the upwind gradient) or refining a skeleton point by solving an optimization sub-problem of locating the center of a sphere that touches the boundary of the shape precisely in at least two places.

Computing the surface thickness from the points skeleton can be achieved by casting a ray from the surface to find the nearest skeletal point along the normal direction, or a mapping can be built using either the signed distance field or the thinning algorithm to connect each voxel on the interior to its nearest surface voxel. Note that such a mapping can be constructed automatically as the skeleton is being formed, rather than having to re-compute it afterwards. Moreover, other thickness measurement approaches can be used, such as the ray casting, sphere fitting, or rolling ball techniques referenced above.

Figure 4A:
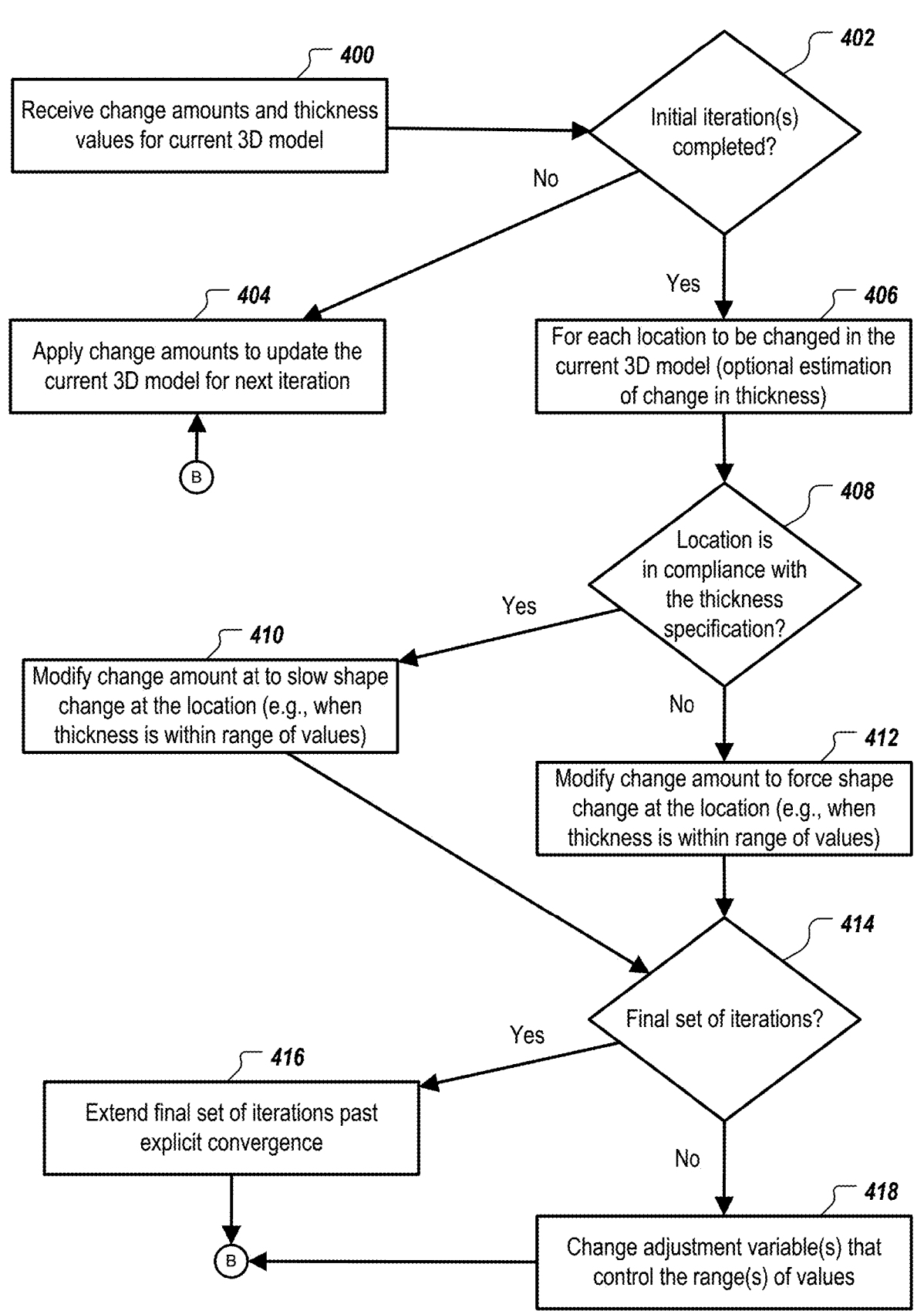
FIG. 4A shows an example of a ramped scaling process for applying a thickness constraint.

Each of such thickness measurement techniques can be used with the ramped scaling process for applying a thickness constraint, which is now described. FIG. 4A shows an example of a ramped scaling process for applying a thickness constraint, which can be implemented in the 3D model update 185C of FIG. 1C. Change amounts indicated by a current numerical assessment (e.g., a velocity field generated from the numerical simulation performed for the current 3D model) are received 400 along with thickness values (e.g., level-set difference measured thicknesses at the surface of the three-dimensional shape of the current 3D model).

In some implementations, a check 402 determines whether an initial set of one or more iterations of the optimization loop have been completed. Note that this check can be explicit, with a resulting branch in the process as shown, or this check can be implicit, as a result of a function-based approach that uses a control variable to ensure no modifications are made to the change amount (e.g., the advection velocity) early on in the iterative loop. Restricting the modification of the change amounts for the current 3D model, before applying 404 the change amounts to update the current 3D model for the next iteration, until later on in the optimization loop can provide advantages in terms of the quality of the final shapes that are achievable.

This can be especially true in the case of topology optimization, where allowing portions of the current 3D shape to shrink to nothing before applying a minimum thickness constraint is important for enabling different geometric solutions to the current optimization problem to be found. Because one of the main ways topology changes occur in generative design is through removing beams by shrinking them to nothing, it is desirable to not have a minimum thickness constraint active for the entirety of the solve, thus allowing the optimizer time to remove some redundant beams from the design. Also, the thickness constraint prevents sheets from thinning to the point where new holes are created because the two faces intersected. To address these issues, the velocity filter can be turned on (or ramped up) in a gradual way as the optimization progresses. Nonetheless, in some implementations, such as shape only optimization loops, the slowing of the shape change 410 (addressed below) can begin in the first iteration of the optimization loop.

When the modification of the change amounts does commence, the potential for modification can be applied 406 to each location to be changed in the current 3D model. When a given location is in compliance 408 with the thickness specification, the change amount at that location is modified 410 to slow any shape change in a direction toward the thickness specification (e.g., to slow thinning at the location when the thickness specification is a minimum thickness, and to slow thickening at the location when the thickness specification is a maximum thickness). In addition, the slowing 410 of the shape change can be by an amount that is based on a difference between the thickness specification and a measured thickness at the location. Thus, as the thickness approaches the specified thickness limit, any shape change heading toward that specified thickness is slowed more, including potentially stopping any shape change at a location that has already reached the specified thickness limit.

Even with this slowing of the shape changes, it is possible for a given location to achieve a thickness that is not in compliance with the thickness specification, i.e., the thickness at the location has passed the specified thickness limit. When this happens, the change amount at the location can be modified 412 to force a shape change in a direction toward the thickness specification. In some implementations, this forcing of a shape change in the direction toward the thickness specification is by an amount that is based on a difference between the thickness specification and the measured thickness at the location. Thus, the farther the thickness at the location has moved beyond the specified thickness limit, the more it is push back to the specified thickness limit.

In some cases, this forcing of shape changes is undesirable, such as the case where certain portions of the current 3D model should be allowed to get thinner and thinner, until they are eliminated from the current 3D model being generatively designed. Thus, in some implementations, a ramp-up period is used, in which the forcing 412 of shape changes (and optionally the slowing 410 of shape changes) are not fully operational until a final set of iterations of the loop. In these implementations, the modifying 410 and/or modifying 412 can be performed when the thickness at the location is within a range of values that is controlled by an adjustment variable. Thus, before a final set of iterations 414 (e.g., during an intermediate set of iterations between an initial set of iterations with no modification of the advection velocities and a final set of iterations with full modification of the advection velocities) one or more adjustment variables that control one or more value ranges can be changed 418 in each iteration of the optimization loop. Note that the change 418 can be implicit in that the iteration number can be an input to a function-based approach, such as described below in connection with FIG. 4B.

Moreover, in some cases, the thickness of a particular portion of the 3D model can oscillate around the thickness specification. For example, with a minimum thickness constraint, the member thickness in a particular region can oscillate around the minimum feature size; in one iteration, the feature is large enough to not be slowed 410, or the slowing 410 is not sufficient, and the optimizer reduces its thickness with an inward velocity past the minimum thickness. In the next iteration, the member is found to be too small, and a shape change is forced 412 to push the member thickness back out to the target thickness. To address this issue, in some implementations, a change in thickness at the location is estimated 406, e.g., using the advection time and optionally the slowed 410 shape change or the forced 412 shape change, and then either the slowed 410 shape change or the forced 412 shape change is adjusted using the estimated change in thickness at the location.

When the ramp-up period is used, it is possible to get a situation where violations of the thickness specification are present after the ramp-up is completed because the forced shape change may not fully restore thin members to the thickness specification in one iteration, but rather may require two or more iterations to achieve compliance. To address this issue, in some implementations, the final set of iterations are extended 416 past explicit convergence, i.e., beyond an iteration at which the one or more design criteria are satisfied, in order to ensure no further forced shape changes are needed to ensure the thickness specification is satisfied.

Figure 4B:
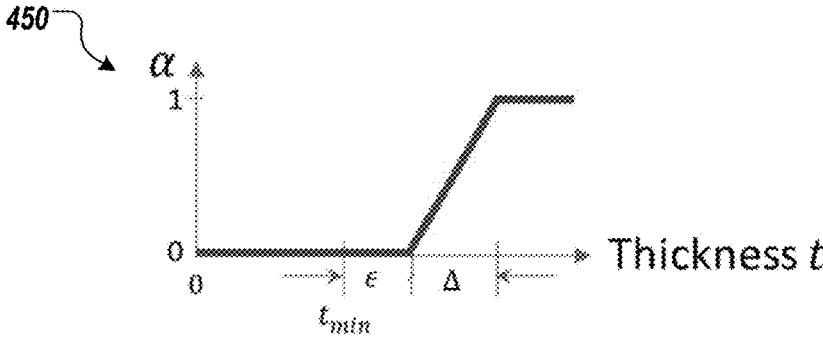
FIG. 4B shows examples of functional control of a ramped scaling process for applying a thickness constraint.
Figure 4B:
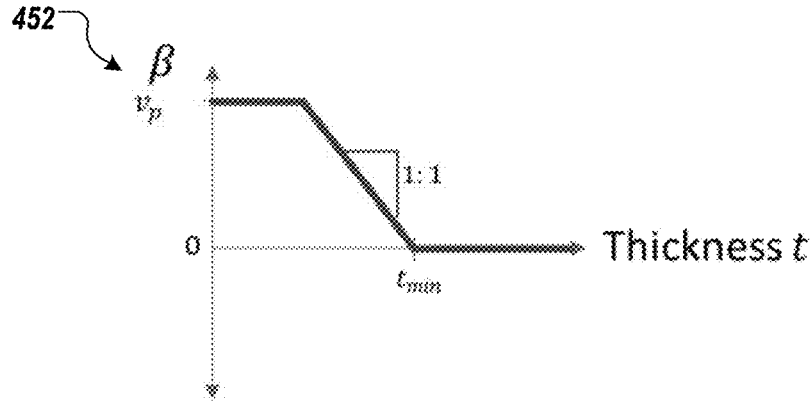
Figure 4B:
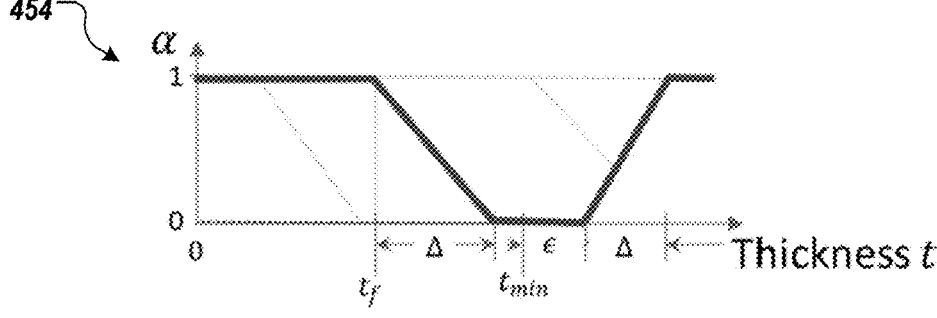
Figure 4B:
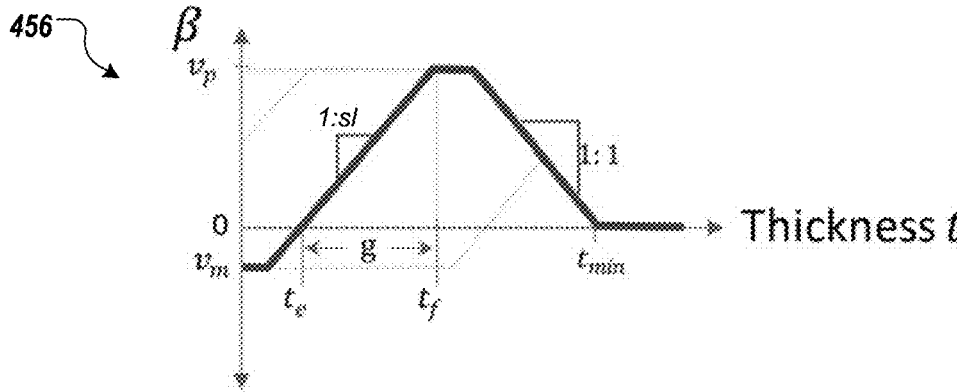

As noted above, a function-based implementation can be used. In such implementations, separate functions can be used for the slowing 410 and the forcing 412. Each such function can be a continuous function or a piecewise linear function, or even potentially a discontinuous function. FIG. 4B shows examples of functional control of a ramped scaling process for applying a thickness constraint. In connection with FIG. 4B, "t" is now used to denote the local thickness at the surface of the 3D model, rather than travel along a ray in the skeleton refinement algorithm described above. Also, the examples discussed in connection with FIG. 4B are for a minimum thickness constraint, but the general approaches described here are equally applicable to a maximum thickness constraint and a thickness ratio constraint.

The measured thickness values are used to drive the constraint, which can manipulate the advection velocities to keep regions of the part from shrinking below the minimum feature size target thickness. For implementations that use a "steady state" constraint, the constraint can take the form of a velocity filter, manipulating the velocity at each point according to Equation 10, in which the new velocity v' is scaled and offset from the input velocity v with factors $\alpha$ and $\beta$, respectively. The max($\cdot$) operator ensures that the filter never scales outward-oriented velocities (so the scaling component only applies to regions of inward velocities).

$$v'=\max(a,v,v)+\beta \qquad (10)$$

The formulation of the scaling and additive factors is a heuristic, and represents just one of a myriad of possible approaches. Intuitively, if a region of the design is much thicker than the minimum feature size, we do not modify the velocity ($\alpha=1$; $\beta=0$). If the design is getting close to the minimum feature size, we want to keep the velocity from shrinking the shape further by slowly decreasing $\alpha$ to 0. If a region of the design is smaller than the target minimum feature size, we add a small positive outward velocity to cause the shape to grow. Thus, a first piecewise linear function 450 controls the value of $\alpha$ (the scaling component of the velocity filter), and a second piecewise linear function 452 controls the value of $\beta$ (the additive component of the velocity filter).

In FIG. 4B, $t_{min}$ is the requested minimum feature size, $\epsilon$ is an estimate of the thickness measurement error (e.g., 1 voxel), $\Delta$ is the size of the transition zone between $\alpha=0$ and $\alpha=1$ (e.g., 1.5*max outward velocity, voxels), and $v_p$ is the maximum amount of outward velocity we apply in too-small regions (e.g., 0.5 voxels/advection timestep). As shown, the scaling component $\alpha$ ramps down from unconstrained shrinkage to no more shrinkage, but the ramp portion (in addition the rest of the function for a) need not be linear.

However, if a steady-state velocity filter is active from the very beginning of the optimization, the optimizer will be unable to create topology change by shrinking bars until they cease to exist or adding holes to sheets. This ability is important for the optimizer to remove redundant load paths and quickly arrive at the best possible design. Thus, in some implementations, the constraint is ramped up over multiple iterations of the optimization loop. The velocity filter can be initially inactive, after a fixed number of iterations, the constraint can begin to ramp up, and over the course of a pre-determined number of further iterations it can smoothly transition from fully disabled to the steady-state velocity constraint given above.

During ramp-up, the scaling and additive coefficients can again be represented as piecewise linear functions. Thus, a first piecewise linear function 454 controls the value of $\alpha$ (the scaling component during ramp-up), and a second piecewise linear function 456 controls the value of $\beta$ (the additive component during ramp-up). In FIG. 4B, $t_{min}$ is the requested minimum feature size, $t_f$ is the thickness above which inward velocity is lowered or set to zero (varies with ramp-up), $t_e$ is the "equilibrium" thickness at which we apply neither positive nor negative additive velocity correction (varies with ramp-up) with g being the current distance between $t_e$ and $t_f$, $\epsilon$ is an estimate of the thickness measurement error (e.g., 1 voxel), $\Delta$ is the size of the transition zone between $\alpha=0$ and $\alpha=1$ (e.g., 1.5*max outward velocity, voxels), $v_p$ is the maximum amount of outward velocity we apply in too-small regions (e.g., 0.5 voxels/advection timestep), $v_m$ is an optional maximum inward velocity for very-too-small regions (can be set to zero to disable), and sl is the slope of the additive component ramp transition (0.25). In addition to the option of eliminating $v_m$ entirely, in some implementations, $t_e$ is also not used.

The ramping effect is achieved by manipulating the "freeze thickness" $t_f$, which sweeps from $t_f=t_{min}+\epsilon+\Delta$ at the beginning of ramp-up to $t_f=-\Delta$ at the end of the ramp-up period (e.g., $t_f$ changes as a function of the iteration number). In this way, at the beginning of the ramp-up, the filter has no effect (since all $\alpha$ are 1 and all $\beta$ are 0). As the freeze thickness starts to decrease, the thickest members of the structure are constrained first so they cannot shrink further, and thinner members are left free to change. This enables the optimizer to decide to remove unnecessary thinner members as it feels pressure from the constraint to bring thicker members into alignment with the minimum feature size target.

This ramping approach (gradual introduction of the thickness constraint) facilitates the production of better generative designs because the optimizer is forced to make the decisions (about whether small fingers of material are worth preserving) from the largest to the smallest in a specific order: as $t_f$ goes from a big value down to a small value, we start to discourage shrinking of the bigger fingers (i.e., those that are bigger than $t_f$ and smaller than $t_{min}+\epsilon+\Delta$) but there is no discouragement for the smaller fingers yet (i.e., those smaller than $t_f$). For the additive component $\beta$, $t_f$ is the point at which we stop introducing the maximum allowed amount of push that we are allowed to give for the local thickness and ramp it down; the use of the ramp to the left of $t_f$ is telling the optimizer that these thin fingers are not good places to free up volume, which encourages the optimizer to find other places to free up volume, or eliminate the finger entirely (if it is not really needed) to get the desired volume reduction. In addition, in some implementations, $v_m$ is set to a non-zero, negative number, which means that for very small fingers, we are going to try to preferentially shrink them faster to get them to go away.

Further, as noted above, with ramp-up enabled, it is possible to get a situation where violations of the minimum feature size constraint are present after the ramp-up is complete. Since the smallest features are frozen last, the filter may take a number of iterations to grow the smallest features up to the minimum feature size target thickness. This so-called "settling time" must elapse before the design fully meets the minimum feature size requirement and can be computed as $v_p/t_{min}$, assuming the design is advected for 1.0 time on each iteration. Design convergence can thus be suppressed until after the specified settling iterations have elapsed.

In addition, sometimes the member thickness in a particular region oscillates around the minimum feature size. In one iteration, the feature is large enough to not be constrained, and the optimizer reduces its thickness with an inward velocity. In the next iteration, the member is found to be too small, and a non-zero $\beta$ velocity is added to push the member thickness back out to the target thickness. To combat this oscillation, an "advection fix" adds an additional, additive term $\gamma$ to the filter to compensate for any not-yet-applied inward advection. The filter function can be rewritten as shown in Equation 11.

$$v'_2 = v' + \gamma = \max(av, v) + \beta + \gamma \qquad (11)$$

The likely change in thickness because of the filtered advection velocity at each point can be estimated as $t_{new} = t + v' \Delta T$, where $\Delta T$ is the advection time. This may overestimate the actual change in thickness if the normal direction is not parallel to the vector to the skeleton at this point, but it also may under-estimate the change in thickness if the opposing side of the structure also has a negative velocity. In practice, it is found to work well and avoids additional computations to handle these unknowns more correctly. The additive term $\gamma$ is chosen so that the actual estimated new thickness is not less than the target minimum feature size as in Equation 12.

$$\gamma = \max\left(\frac{(t_{min} - t_{new})}{\Delta T}, 0\right) \qquad (12)$$

Note that many variations are possible for this thickness constraint application. The ramp-up phase can be omitted, or can start at iteration 0 (so it ramps up linearly from the beginning instead of waiting a pre-determined number of iterations). The ramp-up can be achieved with a linear interpolation between the unconstrained and constrained velocity values, with the mixing ratio gradually increasing from 0 to a value near 1.0 over the course of a number of iterations. The ramp-up phase can be replaced by a hybrid geometry/velocity filter. On the first iteration in which the constraint should be applied, a geometry filter can use the corrected level set to inflate all of the thin regions of the design, and the velocity filter can be put into full force immediately. This would remove any need for the settling time step.

The settling time step can be omitted or replaced with a geometry filter at the end of ramp-up which enlarges all remaining thin members to meet the feature size requirements. See U.S. Publication No. 2021-0356939, filed 18 May 2020 and published 18 Nov. 2021, titled "COMPUTER AIDED GENERATIVE DESIGN WITH FILTERING TO FACILITATE 2.5-AXIS SUBTRACTIVE MANUFACTURING PROCESSES", for details regarding geometry filtering, which publication is hereby incorporated by reference. Moreover, the advection fix can be reformulated using a different set of approximations for the estimated change in the level set field or can operate in a loop in which the advection is performed and the resulting thickness is again measured, with the filter iteratively updating the velocity values until the desired thickness at each voxel for this iteration is obtained.

As an alternative to the velocity filter approach, a "step-and-project" geometry filter can be used, where the geometry is adjusted after each iteration to the nearest shape which satisfies the constraint. The corrected level set function can be used for thickness measurement is such a shape, and in the step-and-project approach, the thickness would be measured after advection occurs and the output level set would be replaced with the corrected level set function. This new shape then forms both the output to the user as well as the input the next topology optimization iteration.

Maximum feature size control can be achieved using similar methods to those described above. Thickness can be measured using the same method, though the corrected level set can be replaced with a nearest skeletal point approach (explicit filtering of preserve regions may be required). The constraint formulation would look similar to that shown for minimum feature size control, except the sign of the velocity filter can be switched so that the optimizer is only allowed to shrink the geometry (instead of growing it) and for violating regions an inward $\beta$ correction term can be applied.

In some cases, the constraint is not on the absolute minimum thickness allowed by the manufacturing process, but on the overall mechanical stability of the resulting assembly. In these cases, it is sometimes desirable to replace or supplement the minimum feature size constraint with a minimum aspect ratio constraint, which thickens long, skinny bars even if they are larger than the specified minimum feature size.

Aspect ratio control can be applied using the framework described above with a minor change. The line skeleton can be partitioned into connected regions (split at the junction points or at transitions to/from regions with radius greater than $r_{min}$) and the length of each segment can be used to select a minimum thickness required to maintain the target aspect ratio. Further, the constraint formulation can be modified to have $t_{min}$ be a spatially-varying parameter based on which partition of the design each point belongs to.

Figure 5:
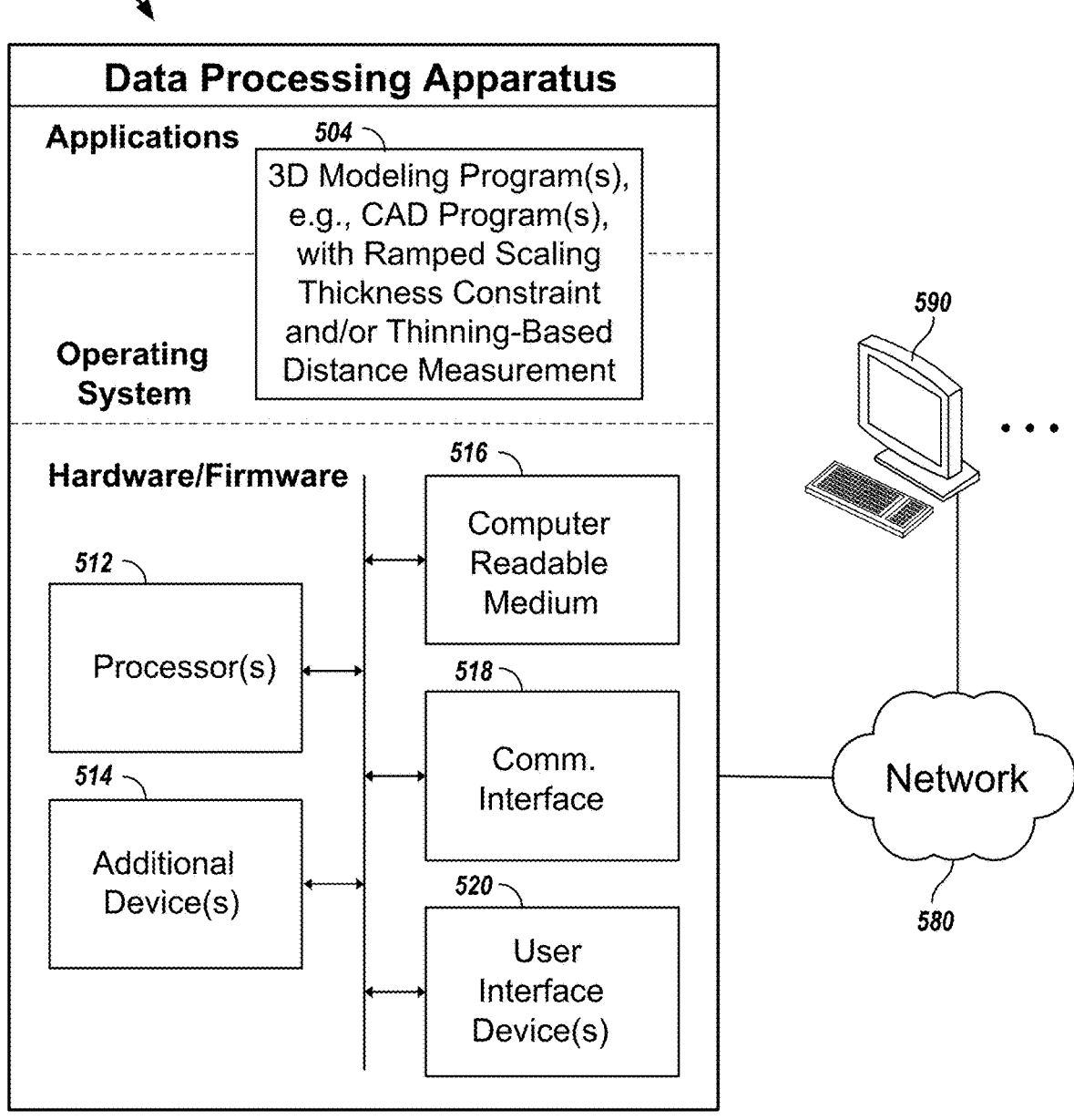
FIG. 5 is a schematic diagram of a data processing system including a data processing apparatus, which can be programmed as a client or as a server, and implement the techniques described in this document.

FIG. 5 is a schematic diagram of a data processing system including a data processing apparatus 500, which can be programmed as a client or as a server. The data processing apparatus 500 is connected with one or more computers 590 through a network 680. While only one computer is shown in FIG. 5 as the data processing apparatus 500, multiple computers can be used. The data processing apparatus 500 includes various software modules, which can be distributed between an applications layer and an operating system. These can include executable and/or interpretable software programs or libraries, including tools and services of one or more 3D modeling programs 504 that implement the voxelized thinning based distance to medial surface process for measuring thicknesses in a 3D model and/or the ramped scaling process for applying a thickness constraint, as described above. Thus, the 3D modeling program(s) 504 can be CAD program(s) 504 (such as CAD program(s) 116) and can implement one or more generative design processes (e.g., using level-set based method(s) for generative design) for topology optimization and physical simulation operations (finite element analysis (FEA) or other) that incorporate geometry filtering and/or simulation results filtering. Further, the program(s) 504 can potentially implement manufacturing control operations (e.g., generating and/or applying toolpath specifications to effect manufacturing of designed objects). The number of software modules used can vary from one implementation to another. Moreover, the software modules can be distributed on one or more data processing apparatus connected by one or more computer networks or other suitable communication networks.

The data processing apparatus 500 also includes hardware or firmware devices including one or more processors 512, one or more additional devices 514, a computer readable medium 516, a communication interface 518, and one or more user interface devices 520. Each processor 512 is capable of processing instructions for execution within the data processing apparatus 500. In some implementations, the processor 512 is a single or multi-threaded processor. Each processor 512 is capable of processing instructions stored on the computer readable medium 516 or on a storage device such as one of the additional devices 514. The data processing apparatus 500 uses the communication interface 518 to communicate with one or more computers 590, for example, over the network 580. Examples of user interface devices 520 include a display, a camera, a speaker, a microphone, a tactile feedback device, a keyboard, a mouse, and VR and/or AR equipment. The data processing apparatus 500 can store instructions that implement operations associated with the program(s) described above, for example, on the computer readable medium 516 or one or more additional devices 514, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub combination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the estimate of thickness at the medial surface can be used for doing logic, such as whether to activate the thickness requirement in a specific region of the shape at all. Moreover, some implementations do not require feature thickness control, e.g., the described systems and techniques can be used for feature thickness visualization. In addition, actions recited in the claims can be performed in a different order and still achieve desirable results.

What is claimed is:

1. A method comprising:

obtaining, by a computer aided design program, a design space for a modeled object, for which a corresponding physical structure is to be manufactured, one or more design criteria for the modeled object, and a thickness specification for the modeled object;

iteratively varying, by the computer aided design program, a three-dimensional shape of the modeled object in the design space in accordance with the one or more design criteria, wherein the iteratively varying comprises performing a first set of two or more iterations following a second set of zero or more iterations, and wherein during the first set of two or more iterations, the iteratively varying comprises modifying an amount of change indicated by a current numerical assessment of the modeled object, which is generated by numerical simulation, in each iteration of the first set of two or more iterations for use in updating a current version of the three-dimensional shape in the iteration;

wherein the modifying comprises, for each location of multiple locations in a current version of the three-dimensional shape, slowing a shape change, at the location, in a direction toward the thickness specification by an amount that is based on a difference between the thickness specification and a measured thickness at the location when the measured thickness complies with the thickness specification; and providing, by the computer aided design program, the three-dimensional shape of the modeled object for use in manufacturing the physical structure using one or more computer-controlled manufacturing systems.

2. The method of claim 1, wherein the iteratively varying comprises iteratively varying both the three-dimensional shape and a topology of the modeled object in the design space in accordance with the one or more design criteria, wherein the modifying comprises, for each location of multiple locations in a current version of the three-dimensional shape, forcing a shape change, at the location, in a direction toward the thickness specification when the measured thickness does not comply with the thickness specification.

3. The method of claim 2, wherein the forcing comprises forcing a shape change in a direction toward the thickness specification by an amount that is based on a difference between the thickness specification and the measured thickness at the location.

4. The method of claim 2, wherein the modifying comprises, for each location of the multiple locations in the current version of the three-dimensional shape:

estimating a prospected change in thickness at the location using either the slowed shape change or the forced shape change; and adjusting either the slowed shape change or the forced shape change using the estimated change in thickness at the location.

5. The method of claim 1, wherein the second set is a second set of one or more iterations, and the iteratively varying comprises performing a third set of two or more iterations between the second set of one or more iterations and the first set of two or more iterations, and wherein during the third set of two or more iterations, the iteratively varying comprises:

for each location of multiple locations in a current version of the three-dimensional shape, slowing a shape change, at the location, in a direction toward the thickness specification when a measured thickness at the location is within a range of values, one side of the range of values being set by an adjustment control variable; and changing the adjustment control variable over the course of the third set of two or more iterations to move closer to the thickness specification.

6. The method of claim 5, wherein the iteratively varying comprises extending the first set of two or more iterations beyond an iteration at which the one or more design criteria are satisfied, in order to ensure no further forced shape changes are needed.

7. The method of claim 5, wherein the second set is a second set of two or more iterations, and wherein no change, based on the thickness specification, in the amount indicated by the numerical assessment is performed during the second set of two or more iterations.

8. The method of claim 5, wherein the iteratively varying comprises measuring thickness values for the three-dimensional shape, the measuring comprising:

preparing a voxelized sheet and line skeleton for the three-dimensional shape; and defining the thickness values for the three-dimensional shape using the voxelized sheet and line skeleton.

9. The method of claim 5, wherein the thickness specification is a maximum thickness value.

10. The method of claim 5, wherein the thickness specification corresponds to a thickness aspect ratio, and the thickness specification is adjusted at the location based on a ratio of an assessed thickness at the location with respect to a length of a portion of the current version of the three-dimensional shape, the portion containing the location.

11. The method of claim 5, wherein the thickness specification is a minimum thickness value.

12. The method of claim 5, wherein the measured thickness complies with the thickness specification when the thickness at the location satisfies (i) a maximum thickness value, (ii) a thickness aspect ratio, or (iii) a minimum thickness value, with a buffer set in accordance with an estimate of thickness measurement error.

13. The method of claim 12, wherein the slowing is controlled by a first function, and the forcing is controlled by a second function.

14. A non-transitory computer-readable medium encoding a computer aided design program operable to cause one or more data processing apparatus to perform operations comprising:

obtaining a design space for a modeled object, for which a corresponding physical structure is to be manufactured, one or more design criteria for the modeled object, and a thickness specification for the modeled object;

iteratively varying a three-dimensional shape of the modeled object in the design space in accordance with the one or more design criteria, wherein the iteratively varying comprises performing a first set of two or more iterations following a second set of zero or more iterations, and wherein during the first set of two or more iterations, the iteratively varying comprises modifying an amount of change indicated by a current numerical assessment of the modeled object, which is generated by numerical simulation, in each iteration of the first set of two or more iterations for use in updating a current version of the three-dimensional shape in the iteration;

wherein the modifying comprises, for each location of multiple locations in a current version of the three-dimensional shape, slowing a shape change, at the location, in a direction toward the thickness specification by an amount that is based on a difference between the thickness specification and a measured thickness at the location when the measured thickness complies with the thickness specification; and providing the three-dimensional shape of the modeled object for use in manufacturing the physical structure using one or more computer-controlled manufacturing systems.

15. The non-transitory computer-readable medium of claim 14, wherein the second set is a second set of one or more iterations, and the iteratively varying comprises performing a third set of two or more iterations between the second set of one or more iterations and the first set of two or more iterations, and wherein during the third set of two or more iterations, the iteratively varying comprises:

for each location of multiple locations in a current version of the three-dimensional shape, slowing a shape change, at the location, in a direction toward the thickness specification when a measured thickness at the location is within a range of values, one side of the range of values being set by an adjustment control variable; and changing the adjustment control variable over the course of the third set of two or more iterations to move closer to the thickness specification.

16. A system comprising:

a non-transitory storage medium having instructions of a three-dimensional modeling program stored thereon; and one or more data processing apparatus configured to run the instructions of the three-dimensional modeling program to perform operations comprising:

obtaining a design space for a modeled object, for which a corresponding physical structure is to be manufactured, one or more design criteria for the modeled object, and a thickness specification for the modeled object;

iteratively varying a three-dimensional shape of the modeled object in the design space in accordance with the one or more design criteria, wherein the iteratively varying comprises performing a first set of two or more iterations following a second set of zero or more iterations, and wherein during the first set of two or more iterations, the iteratively varying comprises modifying an amount of change indicated by a current numerical assessment of the modeled object, which is generated by numerical simulation, in each iteration of the first set of two or more iterations for use in updating a current version of the three-dimensional shape in the iteration;

wherein the modifying comprises, for each location of multiple locations in a current version of the three-dimensional shape, slowing a shape change, at the location, in a direction toward the thickness specification by an amount that is based on a difference between the thickness specification and a measured thickness at the location when the measured thickness complies with the thickness specification; and providing the three-dimensional shape of the modeled object for use in manufacturing the physical structure using one or more computer-controlled manufacturing systems.

17. The system of claim 16, wherein the three-dimensional modeling program is (i) an architecture, engineering and/or construction program, (ii) a product design and/or manufacturing program, and/or (iii) a media and/or entertainment production program.

18. The system of claim 16, wherein the iteratively varying comprises iteratively varying both the three-dimensional shape and a topology of the modeled object in the design space in accordance with the one or more design criteria, wherein the modifying comprises, for each location of multiple locations in a current version of the three-dimensional shape, forcing a shape change, at the location, in a direction toward the thickness specification when the measured thickness does not comply with the thickness specification.

19. The system of claim 18, wherein the forcing comprises forcing a shape change in a direction toward the thickness specification by an amount that is based on a difference between the thickness specification and the measured thickness at the location.

20. The system of claim 18, wherein the modifying comprises, for each location of the multiple locations in the current version of the three-dimensional shape:

estimating a prospected change in thickness at the location using either the slowed shape change or the forced shape change; and adjusting either the slowed shape change or the forced shape change using the estimated change in thickness at the location.

21. The system of claim 17, wherein the second set is a second set of one or more iterations, and the iteratively varying comprises performing a third set of two or more iterations between the second set of one or more iterations and the first set of two or more iterations, and wherein during the third set of two or more iterations, the iteratively varying comprises:

for each location of multiple locations in a current version of the three-dimensional shape, slowing a shape change, at the location, in a direction toward the thickness specification when a measured thickness at the location is within a range of values, one side of the range of values being set by an adjustment control variable; and changing the adjustment control variable over the course of the third set of two or more iterations to move closer to the thickness specification.

22. The system of claim 21, wherein the iteratively varying comprises extending the first set of two or more iterations beyond an iteration at which the one or more design criteria are satisfied, in order to ensure no further forced shape changes are needed.

23. The system of claim 21, wherein the second set is a second set of two or more iterations, and wherein no change, based on the thickness specification, in the amount indicated by the numerical assessment is performed during the second set of two or more iterations.

24. The system of claim 21, wherein the iteratively varying comprises measuring thickness values for the three-dimensional shape, the measuring comprising:

preparing a voxelized sheet and line skeleton for the three-dimensional shape; and defining the thickness values for the three-dimensional shape using the voxelized sheet and line skeleton.

25. The system of claim 21, wherein the thickness specification is a maximum thickness value.

26. The system of claim 21, wherein the thickness specification corresponds to a thickness aspect ratio, and the thickness specification is adjusted at the location based on a ratio of an assessed thickness at the location with respect to a length of a portion of the current version of the three-dimensional shape, the portion containing the location.

27. The system of claim 21, wherein the thickness specification is a minimum thickness value.

28. The system of claim 21, wherein the measured thickness complies with the thickness specification when the thickness at the location satisfies (i) a maximum thickness value, (ii) a thickness aspect ratio, or (iii) a minimum thickness value, with a buffer set in accordance with an estimate of thickness measurement error.

29. The system of claim 28, wherein the slowing is controlled by a first function, and the forcing is controlled by a second function.

30. The non-transitory computer-readable medium of claim 15, wherein the iteratively varying comprises extending the first set of two or more iterations beyond an iteration at which the one or more design criteria are satisfied, in order to ensure no further forced shape changes are needed.

31. The non-transitory computer-readable medium of claim 15, wherein the second set is a second set of two or more iterations, and wherein no change, based on the thickness specification, in the amount indicated by the numerical assessment is performed during the second set of two or more iterations.

32. The non-transitory computer-readable medium of claim 15, wherein the iteratively varying comprises measuring thickness values for the three-dimensional shape, the measuring comprising:

preparing a voxelized sheet and line skeleton for the three-dimensional shape; and defining the thickness values for the three-dimensional shape using the voxelized sheet and line skeleton.

33. The non-transitory computer-readable medium of claim 15, wherein the thickness specification is a maximum thickness value.

34. The non-transitory computer-readable medium of claim 15, wherein the thickness specification corresponds to a thickness aspect ratio, and the thickness specification is adjusted at the location based on a ratio of an assessed thickness at the location with respect to a length of a portion of the current version of the three-dimensional shape, the portion containing the location.

35. The non-transitory computer-readable medium of claim 15, wherein the thickness specification is a minimum thickness value.

36. The non-transitory computer-readable medium of claim 15, wherein the measured thickness complies with the thickness specification when the thickness at the location satisfies (i) a maximum thickness value, (ii) a thickness aspect ratio, or (iii) a minimum thickness value, with a buffer set in accordance with an estimate of thickness measurement error.

37. The non-transitory computer-readable medium of claim 36, wherein the slowing is controlled by a first function, and the forcing is controlled by a second function.

38. The non-transitory computer-readable medium of claim 14, wherein the iteratively varying comprises iteratively varying both the three-dimensional shape and a topology of the modeled object in the design space in accordance with the one or more design criteria, wherein the modifying comprises, for each location of multiple locations in a current version of the three-dimensional shape, forcing a shape change, at the location, in a direction toward the thickness specification when the measured thickness does not comply with the thickness specification.

39. The non-transitory computer-readable medium of claim 38, wherein the forcing comprises forcing a shape change in a direction toward the thickness specification by an amount that is based on a difference between the thickness specification and the measured thickness at the location.

40. The non-transitory computer-readable medium of claim 38, wherein the modifying comprises, for each location of the multiple locations in the current version of the three-dimensional shape:

estimating a prospected change in thickness at the location using either the slowed shape change or the forced shape change; and adjusting either the slowed shape change or the forced shape change using the estimated change in thickness at the location.

* * * * *